(12) United States Patent
Amiya et al.

(10) Patent No.: US 9,030,701 B2
(45) Date of Patent: May 12, 2015

(54) DISPLAYING A SCREEN OF AN IMAGE FORMING APPARATUS ON A DISPLAY OF A CLIENT DEVICE

(71) Applicant: Konica Minolta, Inc., Chiyoda-ku (JP)

(72) Inventors: Koichi Amiya, Kawaguchi (JP); Kenichi Sawada, Toyohashi (JP); Hiroshi Murakami, Toyokawa (JP); Yusaku Tanaka, Toyokawa (JP); Hiroshi Iwamoto, Toyohashi (JP); Takatsugu Kuno, Toyokawa (JP)

(73) Assignee: Konica Minolta, Inc., Chiyoda-Ku, Tokyo (JP)

( * ) Notice: Subject to any disclaimer, the term of this patent is extended or adjusted under 35 U.S.C. 154(b) by 74 days.

(21) Appl. No.: 14/028,668

(22) Filed: Sep. 17, 2013

(65) Prior Publication Data

US 2014/0078549 A1 Mar. 20, 2014

(30) Foreign Application Priority Data

Sep. 20, 2012 (JP) ................. 2012-207357

(51) Int. Cl.
*H04N 1/00* (2006.01)
*G06F 3/12* (2006.01)

(52) U.S. Cl.
CPC ....... *H04N 1/00411* (2013.01); *H04N 1/00233* (2013.01); *H04N 1/00307* (2013.01); *H04N 1/00482* (2013.01); *H04N 1/00973* (2013.01); *H04N 2201/0075* (2013.01); *H04N 2201/0094* (2013.01)

(58) Field of Classification Search
CPC .......... H04N 1/00411; H04N 1/00482; H04N 1/00233; H04N 1/00973; H04N 2201/0075; H04N 1/00307; H04N 2201/0094
USPC ......................................................... 358/1.15
See application file for complete search history.

(56) References Cited

FOREIGN PATENT DOCUMENTS

| JP | 2005-20101 | A |   | 1/2005 |
|----|------------|---|---|--------|
| JP | 2008-276693 | A |   | 11/2008 |
| JP | 2009-037488 | A |   | 2/2009 |
| JP | 2011-124914 | A | * | 6/2011 |
| JP | 2012-090077 | A |   | 5/2012 |
| JP | 2012-178086 | A |   | 9/2012 |

OTHER PUBLICATIONS

English language machine translation of JP 2011-124914 to IDS, Published Jun. 23, 2011.*
Notice of Grounds of Rejection issued Sep. 24, 2014 in the corresponding Japanese Patent Application No. 2012-207357 and English language translation (5 pages).

* cited by examiner

*Primary Examiner* — Eric A Rust
(74) *Attorney, Agent, or Firm* — Buchanan Ingersoll & Rooney

(57) ABSTRACT

An MFP (Multi-Functional Peripheral) as an image forming apparatus displays a remote operation screen that is a screen for operating the MFP on an operation terminal and accepts a print setting and a print execution instruction from the operation terminal through the remote operation screen. The MFP prints the acquired image with the print setting accepted through the remote operation screen if a print execution instruction is accepted through a screen of an application different from an application that accepts a request for display of the remote operation screen.

17 Claims, 35 Drawing Sheets

FIG.27

|  | NUMBER OF COPIES | SORT PRINT | COLLATE | PAPER FEED TRAY | PRINT SIDE | LANDSCAPE OR PORTRAIT |
|---|---|---|---|---|---|---|
| PANEL INITIAL VALUES | 1 | YES | NO | AUTO-SELECT | SINGLE-SIDED | PORTRAIT |
| REMOTE SETTINGS | 5 | YES | NO | AUTO-SELECT | DOUBLE-SIDED | PORTRAIT |
| PRINT APP SETTINGS | 1 | YES | NO | TRAY 1 | DOUBLE-SIDED | PORTRAIT |
| PRINT APP INITIAL VALUES | — | — | — | — | — | — |
| EMPLOYED SETTINGS | 5 | YES | NO | TRAY 1 | DOUBLE-SIDED | PORTRAIT |

FIG.30

|  | NUMBER OF COPIES | SORT PRINT | COLLATE | PAPER FEED TRAY | PRINT SIDE | LANDSCAPE OR PORTRAIT |
|---|---|---|---|---|---|---|
| PANEL INITIAL VALUES | — | — | — | — | — | — |
| REMOTE SETTINGS | 5 | YES | NO | AUTO-SELECT | DOUBLE-SIDED | PORTRAIT |
| PRINT APP SETTINGS | 1 | YES | NO | TRAY 1 | SINGLE-SIDED | LANDSCAPE |
| PRINT APP INITIAL VALUES | 1 | YES | NO | AUTO-SELECT | SINGLE-SIDED | PORTRAIT |
| EMPLOYED SETTINGS | 5 | YES | NO | TRAY 1 | DOUBLE-SIDED | LANDSCAPE |

DISPLAYING A SCREEN OF AN IMAGE FORMING APPARATUS ON A DISPLAY OF A CLIENT DEVICE

This application is based on Japanese Patent Application No. 2012-207357 filed with the Japan Patent Office on Sep. 20, 2012, the entire content of which is hereby incorporated by reference.

BACKGROUND OF THE INVENTION

1. Field of the Invention

The present invention relates to an image forming apparatus with a display, and more particularly to an image forming apparatus with improved operability.

2. Description of the Background Art

In recent years, portable information terminals such as smart phones have been sophisticated, and people own portable information terminals instead of PCs (Personal Computers). Portable information terminals allow users to view and edit electronic documents freely at any place. Portable information terminals have been used in various business and daily situations.

With sophistication of portable information terminals, there is a demand for cooperation between an image forming apparatus and a portable information terminal in an image forming system including the image forming apparatus and the portable information terminal.

In order to meet the above-noted demand, a technique of remotely operating an image forming apparatus with a portable information terminal connected to the image forming apparatus via a network is proposed. In this technique, the image forming apparatus transmits the same operation screen as the operation screen appearing on the operation panel of the image forming apparatus, to the portable information terminal. The portable information terminal then displays the received operation screen and accepts operation from a user. The portable information terminal accepting the operation from the user sends information of the operation to the image forming apparatus. The image forming apparatus performs a process based on the received information of the operation and transmits information of an updated screen associated with the process to the terminal.

A conventional technique concerning cooperation between an image forming apparatus and a portable information terminal is disclosed, for example, in Document 1 below. Document 1 below discloses a technique in which image data transmitted by radio from a mobile phone is printed, wherein when setting data including conditions for printing is not received from the mobile phone, default print conditions stored in a default print setting storage unit are set.

[Document 1] Japanese Laid-Open Patent Publication No. 2005-020101

It is assumed that a user of a portable information terminal intends to print a file such as a document saved in the portable information terminal with an image forming apparatus. In this situation, the user cannot give an instruction to print the file from the portable information terminal to the image forming apparatus because data to be printed is present outside the image forming apparatus. The user therefore allows the portable information terminal to activate a general print application (hereinafter also referred to as a print app) installed in the portable information terminal and uses the print app to, for example, make print settings, give a print instruction, and select a file to be printed. The portable information terminal transmits a print execution instruction, print settings, and a file to be printed to the image forming apparatus. The image forming apparatus then prints the received file with the print settings received from the portable information terminal.

However, the print app is not an application for any specific image forming apparatus, and its screen structure including operation keys and display items differs from that of the operation screen displayed on the operation panel of the image forming apparatus. Therefore, the user accustomed to operating the operation panel of the image forming apparatus often has difficulty in finding where the item that the user wants to set is displayed, even looking at the screen of the print app. The user therefore cannot operate the screen of the print app with the same feeling as in the operation panel. The operability is thus poor.

The operation panel of the image forming apparatus allows various settings, whereas the print app allows only general settings for printing. Specifically, for example, the print app allows settings such as single-sided/double-sided print, color, number of copies, and sort/non-sort, but does not allow settings such as N-in-1, density, stapling, punching, fold, and watermark. With the print app, the settings that can be made in the image forming apparatus cannot be fully utilized, and the operability is poor.

SUMMARY OF THE INVENTION

An object of the present invention is to provide an image forming apparatus with good operability.

An image forming apparatus according to an aspect of the present invention has a transmitter/receiver capable of transmission and reception with an external operation terminal, and a display. The image forming apparatus includes a request accepting unit for accepting a request for display of an operation screen from the operation terminal through a first application activated in the operation terminal, a display unit for transmitting an operation screen that is a screen for operating the image forming apparatus to the operation terminal in response to the request for display accepted by the request accepting unit, and displaying the operation screen on the operation terminal, a first setting accepting unit for accepting a print setting and a print execution instruction from the operation terminal through the operation screen displayed by the display unit, a second setting accepting unit for accepting a print setting and a print execution instruction through a screen of a second application that is activated in the operation terminal and is different from the first application, an image acquisition unit for acquiring an image to be printed, and a print unit for printing the image with the setting accepted by the first setting accepting unit and the second setting accepting unit. If the operation screen is displayed on the operation terminal by the display unit and a print execution instruction is accepted through the screen of the second application, the print unit prints the image with the setting accepted by the first setting accepting unit.

The foregoing and other objects, features, aspects and advantages of the present invention will become more apparent from the following detailed description of the present invention when taken in conjunction with the accompanying drawings.

BRIEF DESCRIPTION OF THE DRAWINGS

FIG. 27 is a table schematically showing print settings employed by MFP 1 in a case where print settings are accepted through both the remote operation screen and the screen of the print app in an eighth embodiment of the present invention.

FIG. 30 is a table schematically showing print settings employed by MFP 1 in a case where print settings are accepted through both the remote operation screen and the screen of the print app in a ninth embodiment of the present invention.

DESCRIPTION OF THE PREFERRED EMBODIMENTS

Embodiments of the present invention will be described below with reference to the figures.

An image forming system in the following embodiments includes an operation terminal and an image forming apparatus capable of accepting operation from the operation terminal. In the present embodiment, the image forming apparatus is an MFP (Multi-Functional Peripheral). The image forming apparatus may not be an MFP but may be, for example, a facsimile machine, a copier, or a printer. The operation terminal can communicate with the image forming apparatus either by wire or by radio and is, for example, a tablet, a smart phone, or a PC. In particular when the operation terminal is a PC, the operation terminal does not necessarily have a touch panel display and may accept operation through a keyboard or a pointing device.

[First Embodiment]

Figure 1:
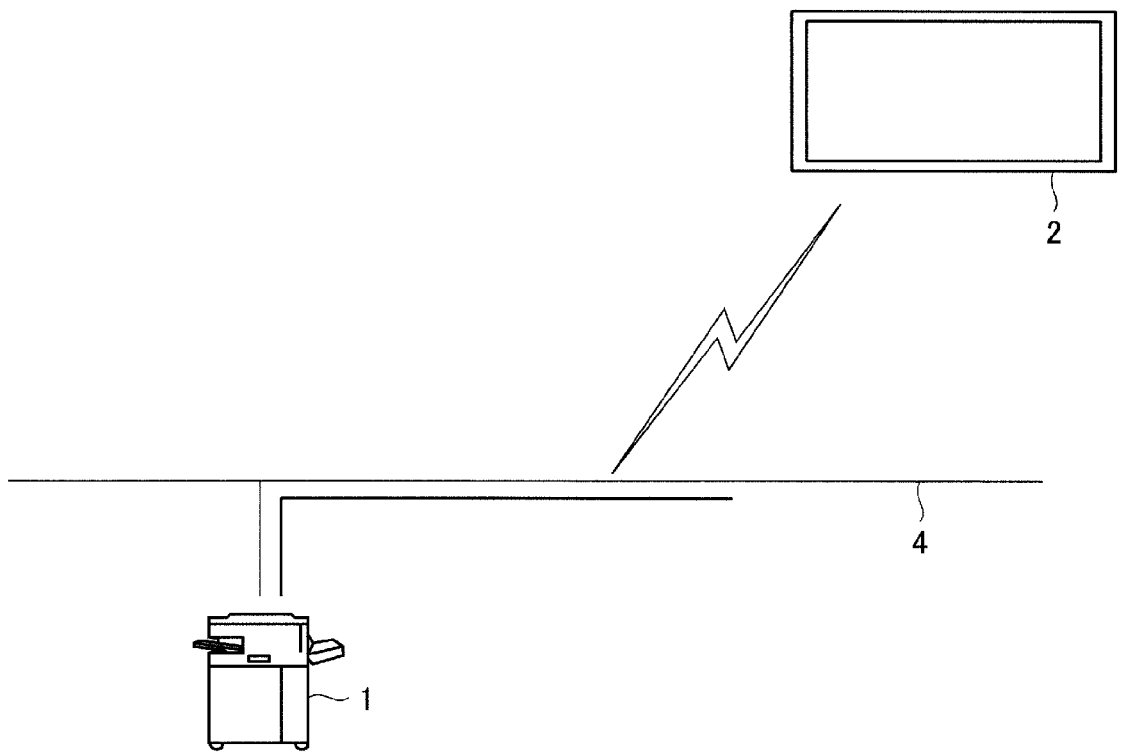
FIG. 1 is a diagram showing an overall configuration of an image forming system.

Referring to FIG. 1, the image forming system includes an MFP 1 and an operation terminal 2. MFP 1 has, for example, a scanner function, a facsimile function, a copy function, a printer function, a data communication function, and a server function. MFP 1 is mutually connected with an external device (not shown) and operation terminal 2 via a network 4.

Network 4 uses a dedicated circuit such as a wired or wireless LAN (Local Area Network). Network 4 connects various devices using a protocol such as TCP/IP (Transmission Control Protocol/Internet Protocol). The devices connected to network 4 can mutually exchange a variety of data. Network 4 may use a general circuit or radio communication.

MFP 1 forms an image of a scanned document or a copy image of an image generated based on print data received from an external device or operation terminal 2, on paper. The print data is produced by, for example, a printer driver converting an imaging instruction issued by an operating system or an application program of an external device or operation terminal 2 into a page description language that can be processed by MFP 1. The print data may be document data written in a file format such as PDF, TIFF, JPEG, or XPS.

MFP 1 can transmit an original image to an external device or operation terminal 2 via network 4. MFP 1 can also accumulate document data received from an external device or operation terminal 2 into a fixed storage device in MFP 1.

Figure 2:
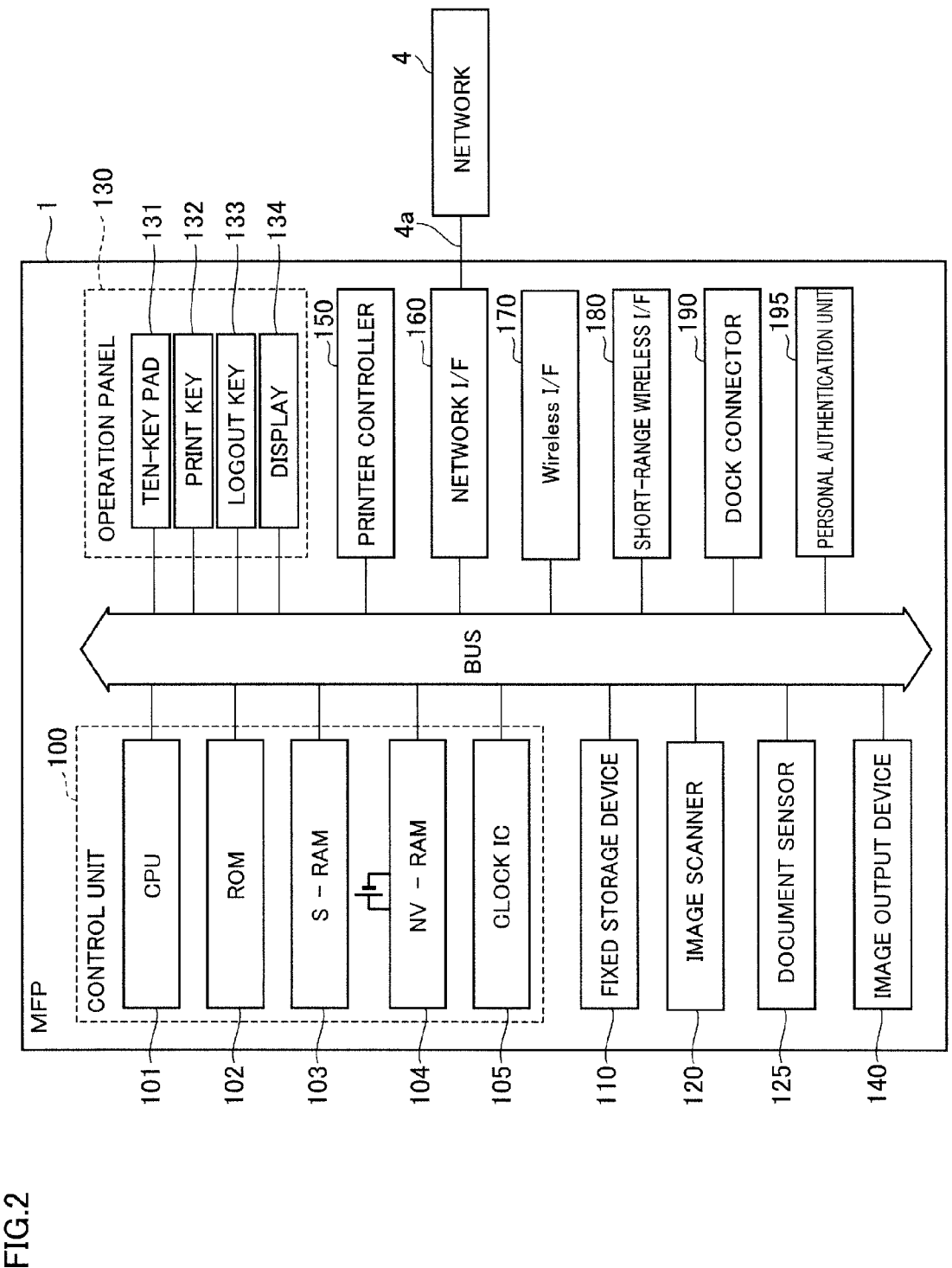
FIG. 2 is a block diagram showing an internal configuration of an MFP 1.

FIG. 2 is a block diagram showing an internal configuration of MFP 1.

Referring to FIG. 2, MFP 1 includes a CPU (Central Processing Unit) 101, a ROM (Read Only Memory) 102, an SRAM (Static Random Access Memory) 103, an NVRAM (Non Volatile Random Access Memory) 104, a clock IC (Integrated Circuit) 105, a fixed storage device 110, an image scanner 120, a document sensor 125, an operation panel 130, an image output device 140, a printer controller 150, a network I/F 160, a wireless I/F 170, a short-range wireless I/F 180, a dock connector 190, and a personal authentication unit 195.

ROM 102, SRAM 103, NVRAM 104, and clock IC 105 are each connected to CPU 101 through a bus. CPU 101, ROM 102, SRAM 103, NVRAM 104, and clock IC 105 constitute a control unit 100. CPU 101 controls the entire MFP 1 for a variety of jobs including a scan job, a copy job, a mail transmission job, and a print job. CPU 101 executes a control program stored in ROM 102. ROM 102 stores the control program for controlling operation of MFP 1. SRAM 103 is a working memory of CPU 101. NVRAM 104 is battery backed up for storing a variety of settings concerning image forming.

Fixed storage device 110, image scanner 120, document sensor 125, operation panel 130 (an example of a display), image output device 140, printer controller 150, network I/F 160, and wireless I/F 170 are each connected to control unit 100 through a bus. Fixed storage device 110 is, for example, a hard disk device and stores data of screens to be displayed on operation panel 130 and operation terminal 2. Image scanner 120 scans an image of a document placed in a document tray (not shown, an example of a placement unit). Document sensor 125 detects a document placed in the document tray, for example, using an infrared sensor. Operation panel 130 mainly includes a ten-key pad 131 for inputting numerals, a start key (print key) 132 for accepting, for example, a print execution instruction, a logout key 133 for accepting an instruction to logout a user, and a display 134 for displaying a variety of information. Operation panel 130 is fixed to the main body of MFP 1 (cannot be removed from the main body of MFP 1). Image output device 140 forms a copy image on paper. Printer controller 150 generates a copy image from print data received through network I/F 160. Network I/F 160 connects MFP 1 to network 4 through a network cable 4a. Network I/F 160 transmits/receives various information to/from an external device or operation terminal 2. Wireless I/F 170 wirelessly communicates with an external device or operation terminal 2.

Short-range wireless I/F 180, dock connector 190, and personal authentication unit 195 are each further connected to control unit 100 through a bus. Short-range wireless I/F 180 is, for example, Bluetooth® or IrDA® and is mainly used for communication with operation terminal 2. Operation terminal 2 is attached to dock connector 190. MFP 1 transmits/receives various data to/from operation terminal 2 through dock connector 190. Personal authentication unit 195 performs an authentication process for users who use MFP 1, for example, by accepting input of ID and password.

Figure 3:
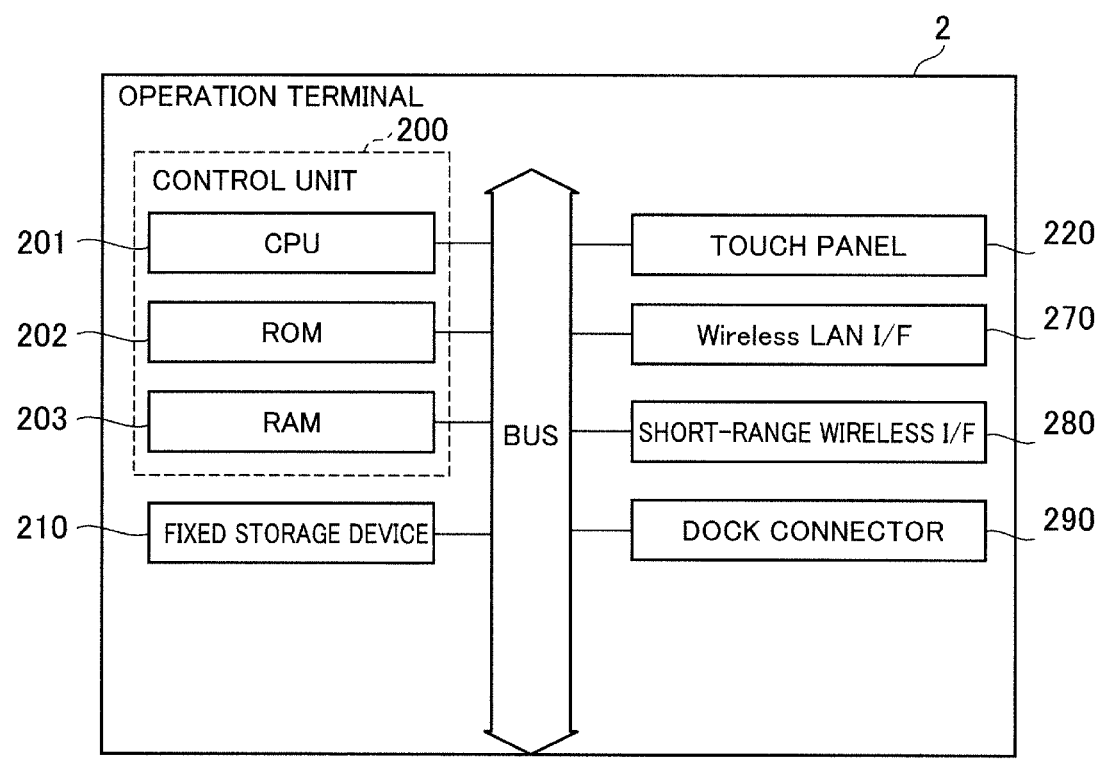
FIG. 3 is a block diagram showing an internal configuration of an operation terminal 2.

FIG. 3 is a block diagram showing an internal configuration of operation terminal 2.

Referring to FIG. 3, operation terminal 2 includes a CPU 201, a ROM 202, a RAM 203, a fixed storage device 210, a touch panel 220, a wireless LAN I/F 270, a short-range wireless I/F 280, and a dock connector 290. ROM 202 and RAM 203 are each connected to CPU 201 through a bus. CPU 201, ROM 202, and RAM 203 constitute a control unit 200. CPU 201 controls the entire operation terminal 2. CPU 201 executes a control program stored in ROM 202. ROM 202 stores the control program for controlling operation of operation terminal 2. RAM 203 is a working memory of CPU 201.

Fixed storage device 210, touch panel 220, wireless LAN I/F 270, short-range wireless I/F 280, and dock connector 290 are each connected to control unit 200 through a bus. Touch panel 220 displays various information and accepts operation input from a user directly touching the screen. Wireless LAN I/F 270 wirelessly communicates with MFP 1. Short-range wireless I/F 280 is, for example, Bluetooth® or IrDA® and is mainly used to communicate with MFP 1. Dock connector 290 is used when operation terminal 2 is attached to MFP 1. Operation terminal 2 transmits/receives various data to/from MFP 1 through dock connector 290.

Fixed storage device 210 is, for example, a hard disk device and stores programs such as a remote panel application (hereinafter also referred to as the remote panel app) or a print app, or various information such as files (images) to be printed. The remote panel app is an application for displaying a remote operation screen for operating MFP 1. The print app is an application for giving a print execution instruction to MFP 1. The print app may be an application for accepting settings of print executed in MFP 1 or the selection of data to be printed.

Operation terminal 2 is portable and is connected by wire to MFP 1 to become ready for communication, for example, when dock connector 290 is attached to dock connector 190 of MFP 1. Operation terminal 2 is connected by radio with MFP 1 to become ready for communication when being present in a range that allows wireless communication with MFP 1 through short-range wireless I/Fs 180 and 280.

Figure 4:
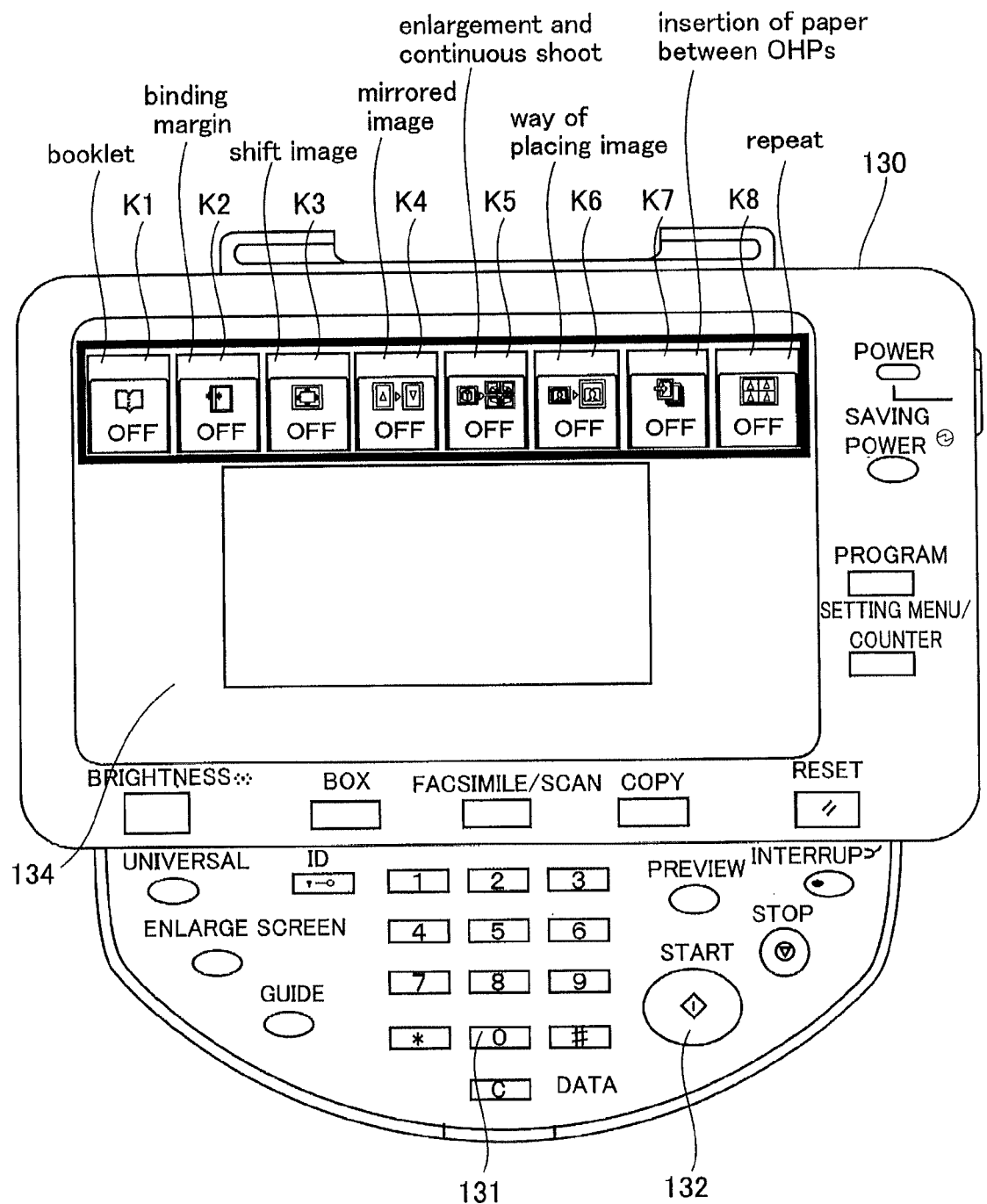
FIG. 4 is a diagram schematically showing an external view of an operation panel 130.

FIG. 4 is a diagram schematically showing an external view of operation panel 130.

Referring to FIG. 4, operation panel 130 mainly includes ten-key pad 131 for accepting input of numerical values, start key 132 for accepting execution of a job of each function, and display 134 for displaying a variety of setting items and messages. An operation screen of MFP 1 is displayed on display 134. Display 134 includes a touch panel and accepts operation from a user. The operation screen displayed on display 134 includes keys K1 to K8 which are software keys for performing operation of MFP 1 (here, print settings). On the right side and the bottom side of display 134, hardware keys such as ten-key pad 131 and start key 132 for performing operation of MFP 1 are provided.

Operation of the image forming system in a case where print settings are made from operation terminal 2 will now be described.

Figure 5:
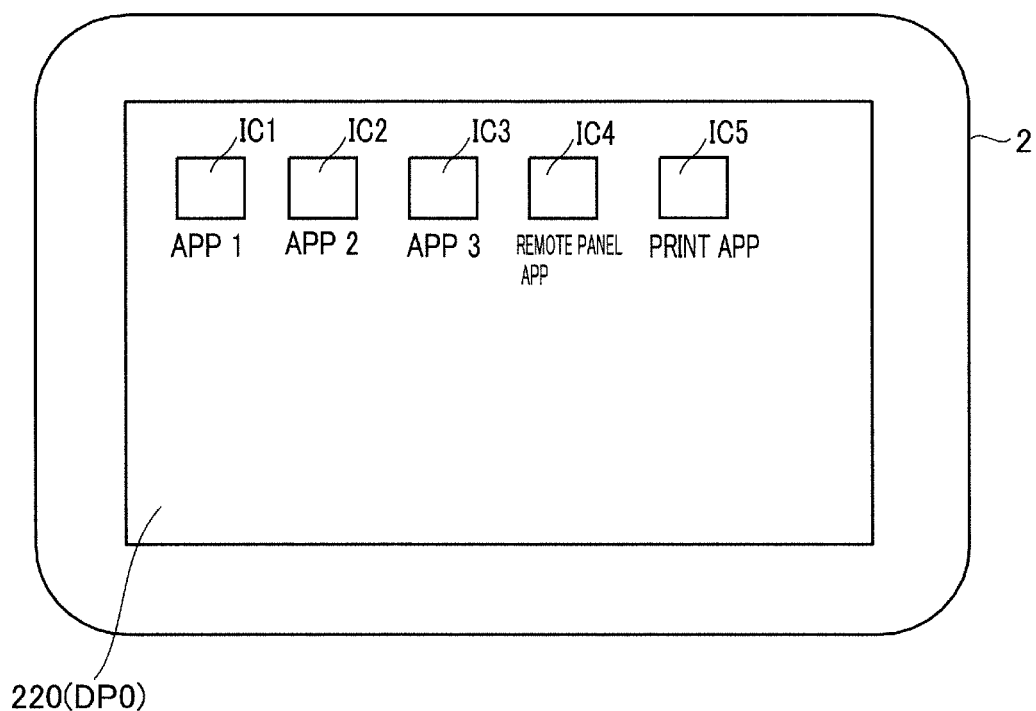
FIG. 5 is a diagram schematically showing operation terminal 2 with a menu screen being displayed.

FIG. 5 is a diagram schematically showing operation terminal 2 with a menu screen being displayed.

Referring to FIG. 5, operation terminal 2 can display a menu screen DP0 on touch panel 220. Menu screen DP0 presents icons IC1 to IC3 of applications 1 to 3, respectively, that can be executed in operation terminal 2. Menu screen DP0 further presents an icon IC4 for activating the remote panel app and an icon IC5 for activating the print app.

When icon IC4 is selected (pressed) by a user, operation terminal 2 activates the remote app and requests MFP 1 to display the remote operation screen through the remote panel app. MFP 1 accepts the request from operation terminal 2 and performs an authentication process for the user of operation terminal 2. If the user authentication is successful, MFP 1 performs a login process for the user and permits operation of MFP 1 from operation terminal 2. Operation terminal 2 can be identified by the IP address or MAC address of operation terminal 2.

When icon IC4 is selected (pressed) by a user, MFP 1 may permit operation of MFP 1 from operation terminal 2 without an authentication process for the user.

Figure 6:
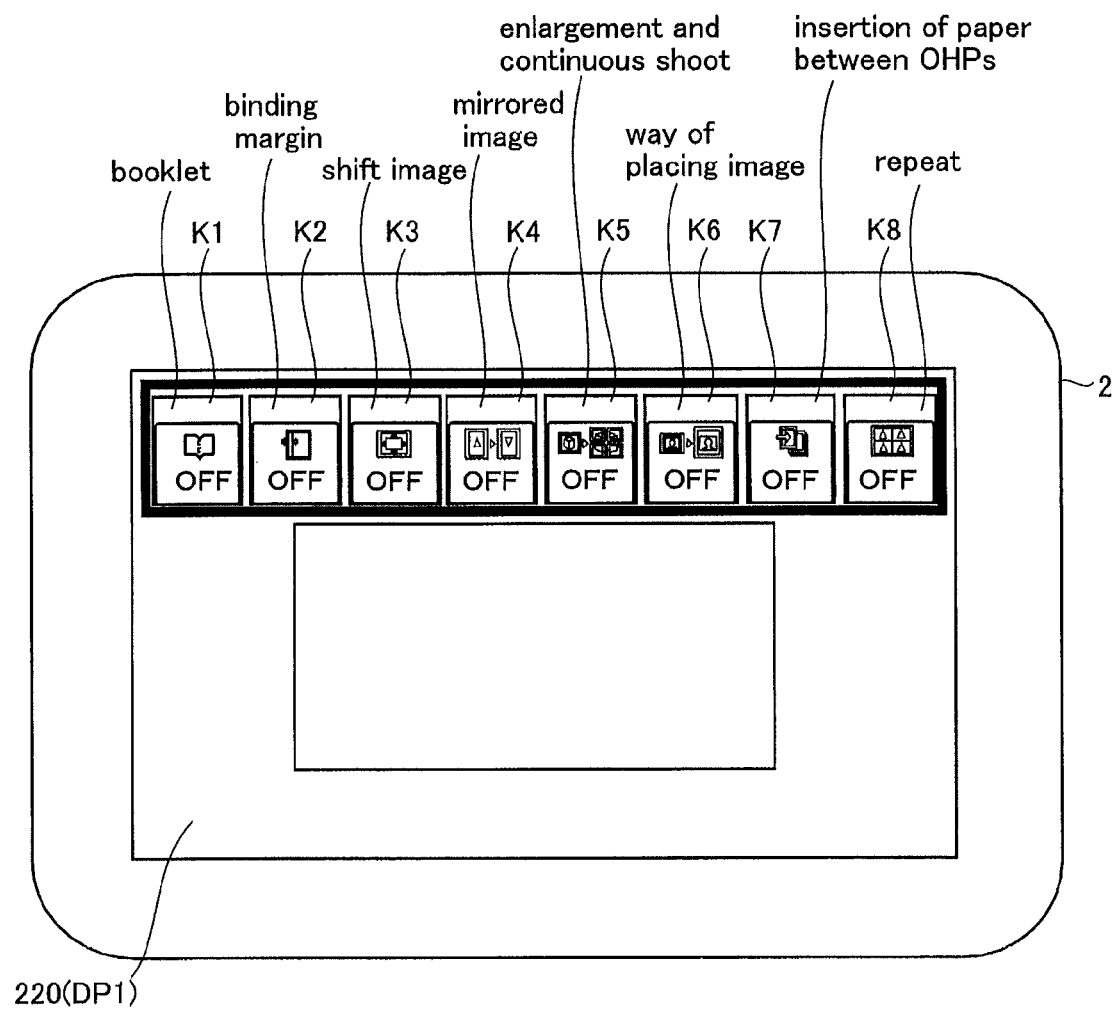
FIG. 6 is a diagram schematically showing operation terminal 2 with a remote operation screen being displayed in a first embodiment of the present invention.

FIG. 6 is a diagram schematically showing operation terminal 2 with a remote operation screen being displayed in the first embodiment of the present invention.

Referring to FIG. 6, MFP 1 permits operation of MFP 1 from operation terminal 2 and then transmits data of a remote operation screen to operation terminal 2. Operation terminal 2 displays a remote operation screen DP1 on touch panel 220 based on the received data. Remote operation screen DP1 is displayed on a layer above menu screen DP0.

Here, the remote operation screen is a screen for operating MFP 1. The remote operation screen at least includes keys K1 to K8 corresponding to the software keys included in the operation screen displayed on display 134 and may additionally include a key representing the hardware key of operation panel 130 (for example, ten-key pad 131 or start key 132 in FIG. 4) or any other software keys.

Here, the same operation screen as the operation screen displayed on display 134 is displayed as remote operation screen DP1 on touch panel 220. The remote panel app is an application dedicated to MFP 1 so that all the settings that can be made on operation panel 130 can be made from remote operation screen DP1.

The user operates MFP 1 by touching the remote operation screen. Operation terminal 2 accepts input from the user through remote operation screen DP1 and then transmits the coordinates of the input to MFP 1. MFP 1 specifies the accepted operation based on the coordinates received from operation terminal 2 and performs a process based on the operation. MFP 1 transmits data of an updated screen of the remote operation screen to operation terminal 2 based on the coordinates received from operation terminal 2. Operation terminal 2 displays the updated screen on touch panel 220 based on the received data. The updated screen transmitted here may be data in a general image file format such as JPEG or TIFF.

For example, when the user presses key K2 for making a binding margin setting (a setting for shifting a print position of an image such that a binding margin is provided in paper), operation terminal 2 transmits the coordinates of key K2 to MFP 1. MFP 1 determines that the binding margin setting is accepted, based on the coordinates received from operation terminal 2, and stores that the binding margin is valid, into SRAM 103, for example. MFP 1 then transmits data of an updated screen to operation terminal 2. Operation terminal 2 displays the updated screen on touch panel 220, based on the received data.

Figure 7:
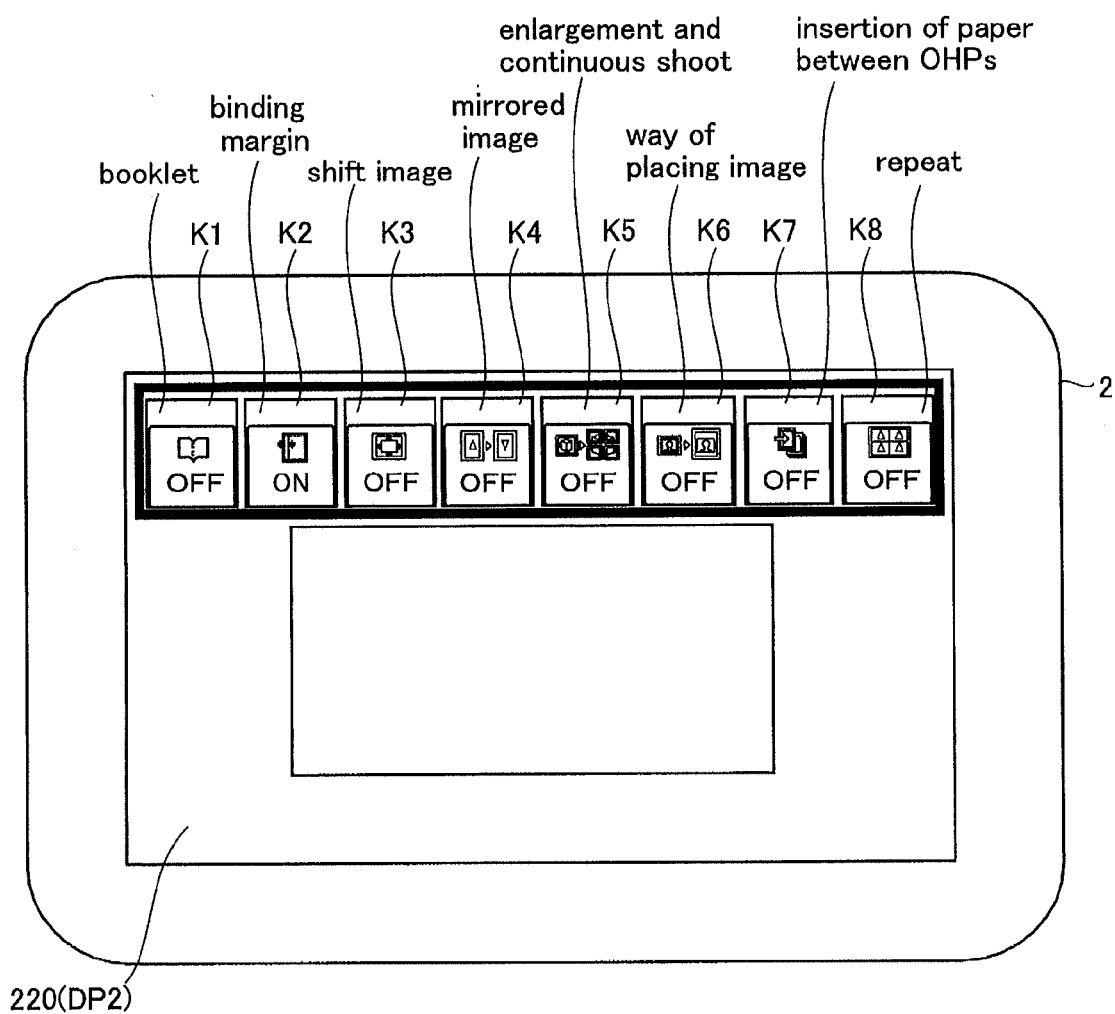
FIG. 7 is a diagram schematically showing operation terminal 2 with an updated screen being displayed when a key K2 is pressed in FIG. 6.

FIG. 7 is a diagram schematically showing operation terminal 2 with an updated screen being displayed when key K2 is pressed in FIG. 6.

Referring to FIG. 7, when key K2 is pressed in the remote operation screen shown in FIG. 6, MFP 1 creates an updated screen DP2 in which characters "OFF" displayed in key K2 is changed to characters "OFF", and transmits the created updated screen to operation terminal 2. Operation terminal 2 displays updated screen DP2 in place of operation screen DP1 on touch panel 220. Updated screen DP2 is displayed on a layer above the menu screen. MFP 1 thus notifies the user that the binding margin setting is valid.

MFP 1 thereafter displays an updated screen on operation terminal 2 based on the coordinates and stores the settings that have been made into, for example, SRAM 103, every time the coordinates are received from operation terminal 2.

In the operation of the image forming system as described above, operation terminal 2 transmits the input coordinates to MFP 1, temporarily stores the image received from MFP 1 into RAM 203, and displays the image on touch panel 220. In other words, operation terminal 2 does not always store data of the remote operation screen in fixed storage device 210. When operation terminal 2 performs such operation, it is difficult on the operation terminal 2 side to determine what setting is made by the user. Therefore, the print setting made by the user is stored on the MFP 1 side (for example, SRAM 103 of MFP 1).

The operation of the image forming system in a case where a print execution instruction is given and an image is transmitted from operation terminal 2 will now be described.

Figure 8:
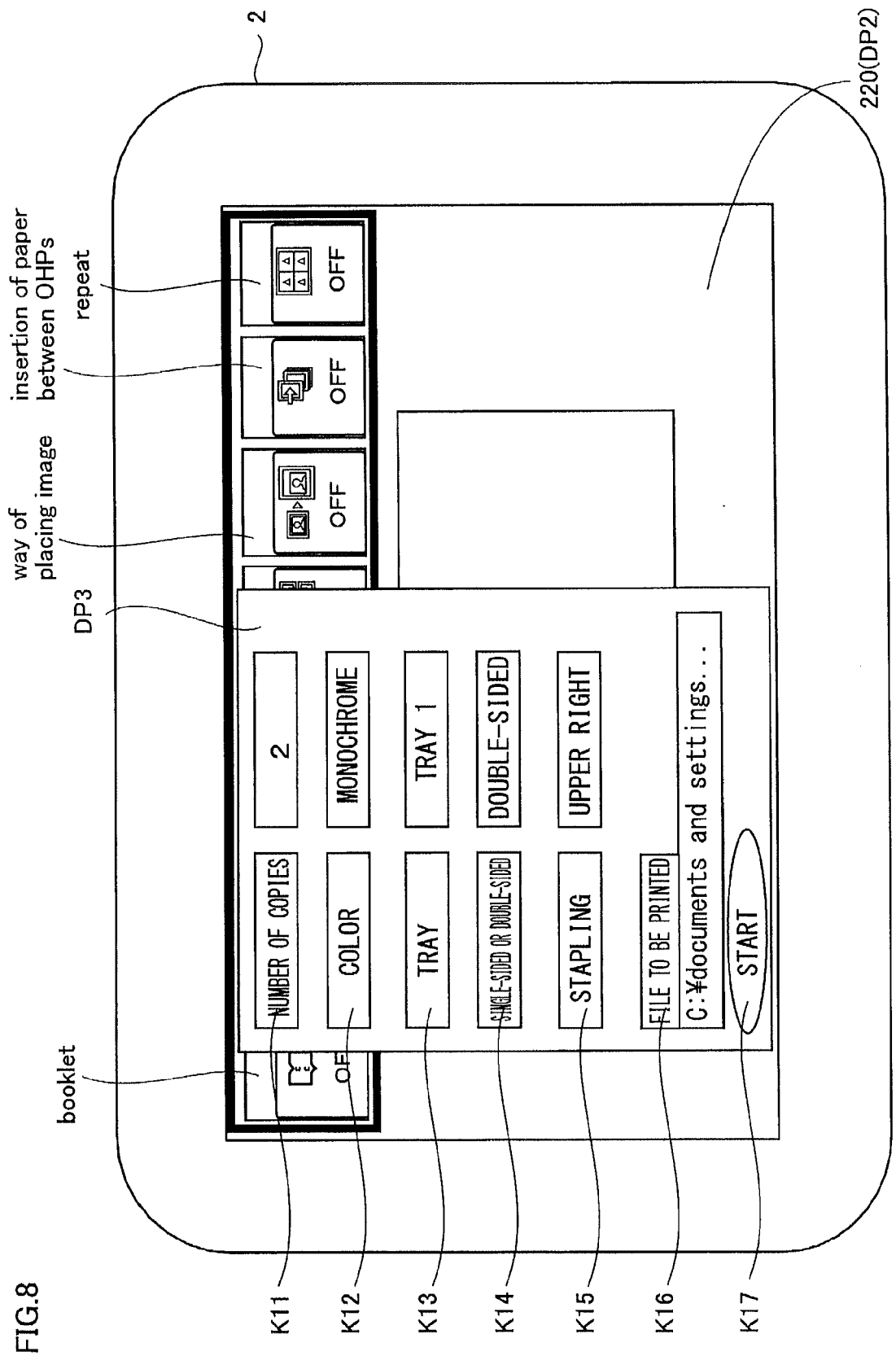
FIG. 8 is a diagram schematically showing operation terminal 2 with a screen of a print app being displayed.

FIG. 8 is a diagram schematically showing operation terminal 2 with a screen of the print app being displayed.

Referring to FIG. 8, when the user selects icon IC5 in the menu screen, operation terminal 2 activates the print app and displays a screen DP3 of the print app on touch panel 220. The print app is a general application for a wide variety of image forming apparatuses.

Screen DP3 of the print app is displayed on a layer above updated screen DP2. Screen DP3 of the print app includes keys K11 to K15 that are software keys for accepting a variety of settings for printing, a key K16 for selecting a file from among files stored in fixed storage device 210 of operation terminal 2, and a key K17 for giving a print execution instruction. Keys K11 to K15 are keys for accepting a setting of number of copies, a setting of print color, a setting of paper to use (for selecting a tray accommodating paper), a setting of single-sided print or double-sided print, and a setting of stapling, respectively. From screen DP3 of the print app, general settings for printing can be made, and only part of the settings that can be made in MFP 1 can be made.

When a press on key K17 is accepted after a file is selected, operation terminal 2 transmits the file selected though screen DP3 of the print app to MFP 1 together with a print execution instruction. When the print execution instruction and the file are received through screen DP3 of the print app, with the remote operation screen (remote operation screen DP1 or updated screen DP2) being displayed on operation terminal 2, MFP 1 prints the file with the settings made through the remote operation screen (the settings stored in SRAM 103). The print settings include a plurality of setting items, and initial values are defined in all the settings. In the following, not only the case where an initial value is changed through the remote operation screen but also the case where the initial values of the setting items are kept is defined as the "print settings" set through the remote operation screen.

Figure 9:
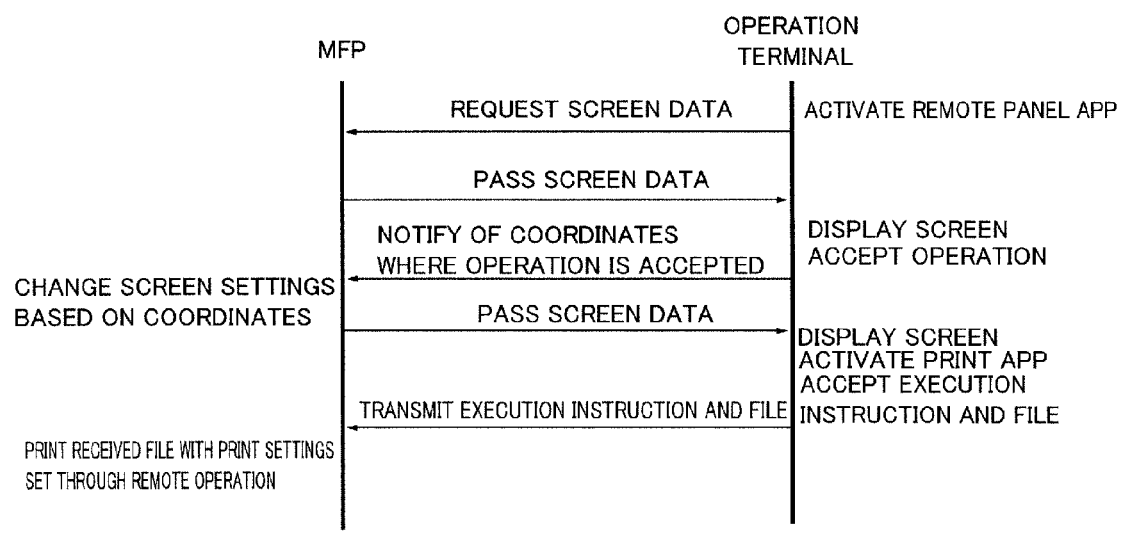
FIG. 9 is a sequence diagram showing an example of communication between MFP 1 and operation terminal 2 in the first embodiment of the present invention.

FIG. 9 is a sequence diagram showing an example of communication between MFP 1 and operation terminal 2 in the first embodiment of the present invention.

Referring to FIG. 9, when the remote panel app is activated, operation terminal 2 requests MFP 1 to transmit data of a remote operation screen. MFP 1 accepts the request from operation terminal 2 and then passes data of the remote operation screen to operation terminal 2 to display the remote operation terminal on operation terminal 2. Operation terminal 2 accepts operation on the remote operation screen and then notifies MFP 1 of the coordinates of the position where the operation is accepted. MFP 1 changes the print settings stored in SRAM 103 (hereinafter also referred to as "panel setting values" since these print settings are to be displayed on operation panel 130) and passes data of an updated screen of the remote operation screen to operation terminal 2 to display the updated screen on operation terminal 2. Operation terminal 2 activates the print app, accepts a print execution instruction and the selection of a file through the print app, and transmits the print execution instruction and the file to MFP 1.

MFP 1 receives the print execution instruction and the file and then prints the received file with the print settings stored in SRAM 103 (the print settings set through remote operation).

Figure 10:
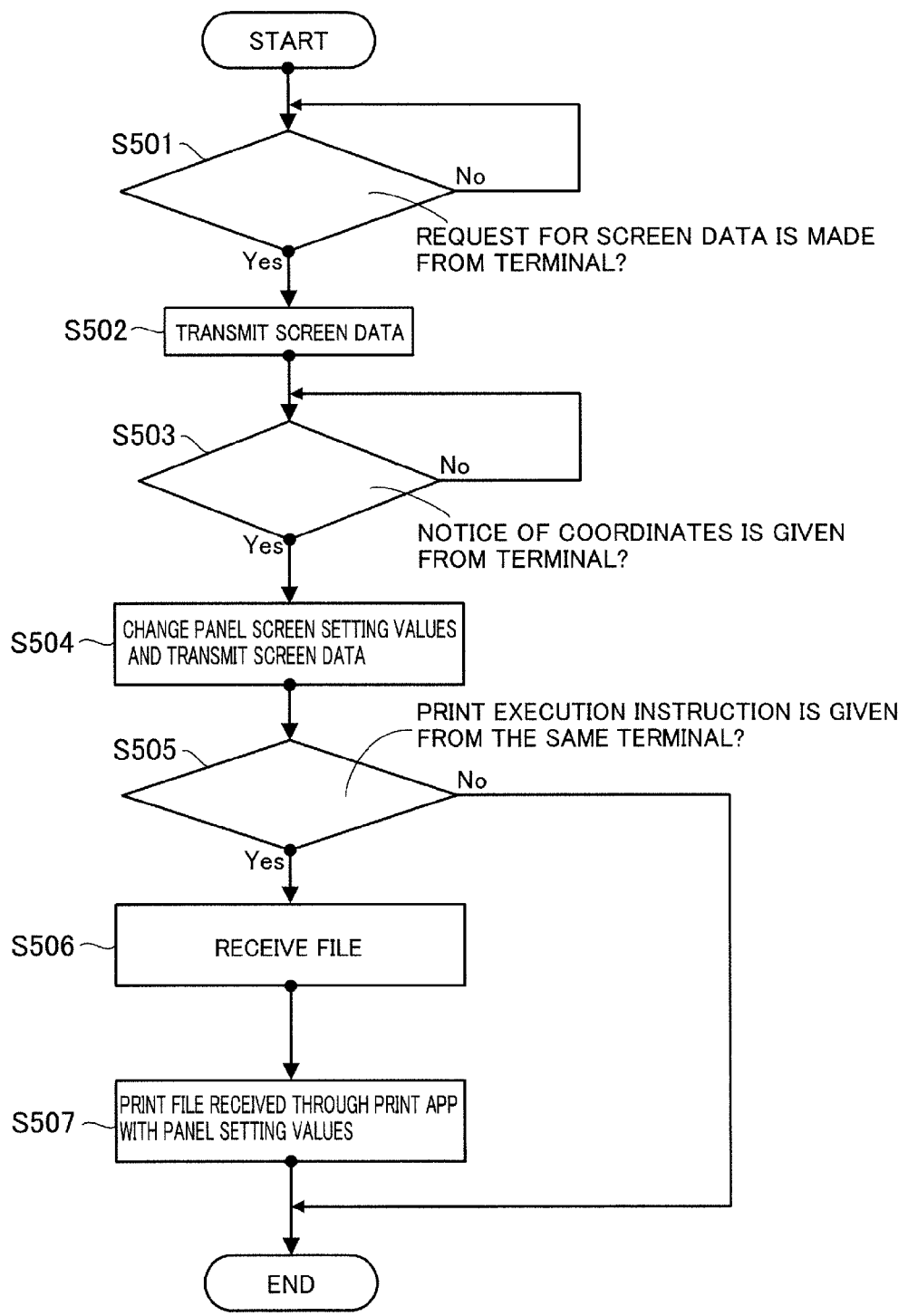
FIG. 10 is a flowchart illustrating operation of MFP 1 in the first embodiment of the present invention.

FIG. 10 is a flowchart illustrating operation of MFP 1 in the first embodiment of the present invention.

Referring to FIG. 10, CPU 101 of MFP 1 determines whether a request for data of a remote operation screen is made from operation terminal 2 (S501). CPU 101 repeats the process in step S501 until it is determined that a request is made.

If it is determined that a request is made in step S501 (Yes in S501), CPU 101 transmits data of a remote operation screen (S502) and determines whether a notice of the coordinates is given from operation terminal 2 (S503). CPU 101 repeats the process in step S503 until it is determined that a notice of the coordinates is given.

If it is determined that a notice of the coordinates is given in step S503 (Yes in S503), CPU 101 changes the print settings stored in SRAM 103 (panel setting values) and transmits data of an updated screen (S504). CPU 101 then determines whether a print execution instruction (print request) is given through the print app different from the remote panel app operated in S501 to S503, from the same operation terminal 2 as the operation terminal that has transmitted the print settings (S505). Whether operation terminal 2 is the same can be identified by identification information such as the IP address of operation terminal 2 or by the ID of the authenticated user.

If it is determined that an execution instruction is given in step S505 (Yes in S505), CPU 101 receives a file to be printed (S506) and prints the received file with the print settings stored in SRAM 103 (panel setting values) (S507). CPU 101 then terminates the process.

If it is determined that an execution instruction is not given in step S505 (No in S505), CPU 101 terminates the process.

Figure 11:
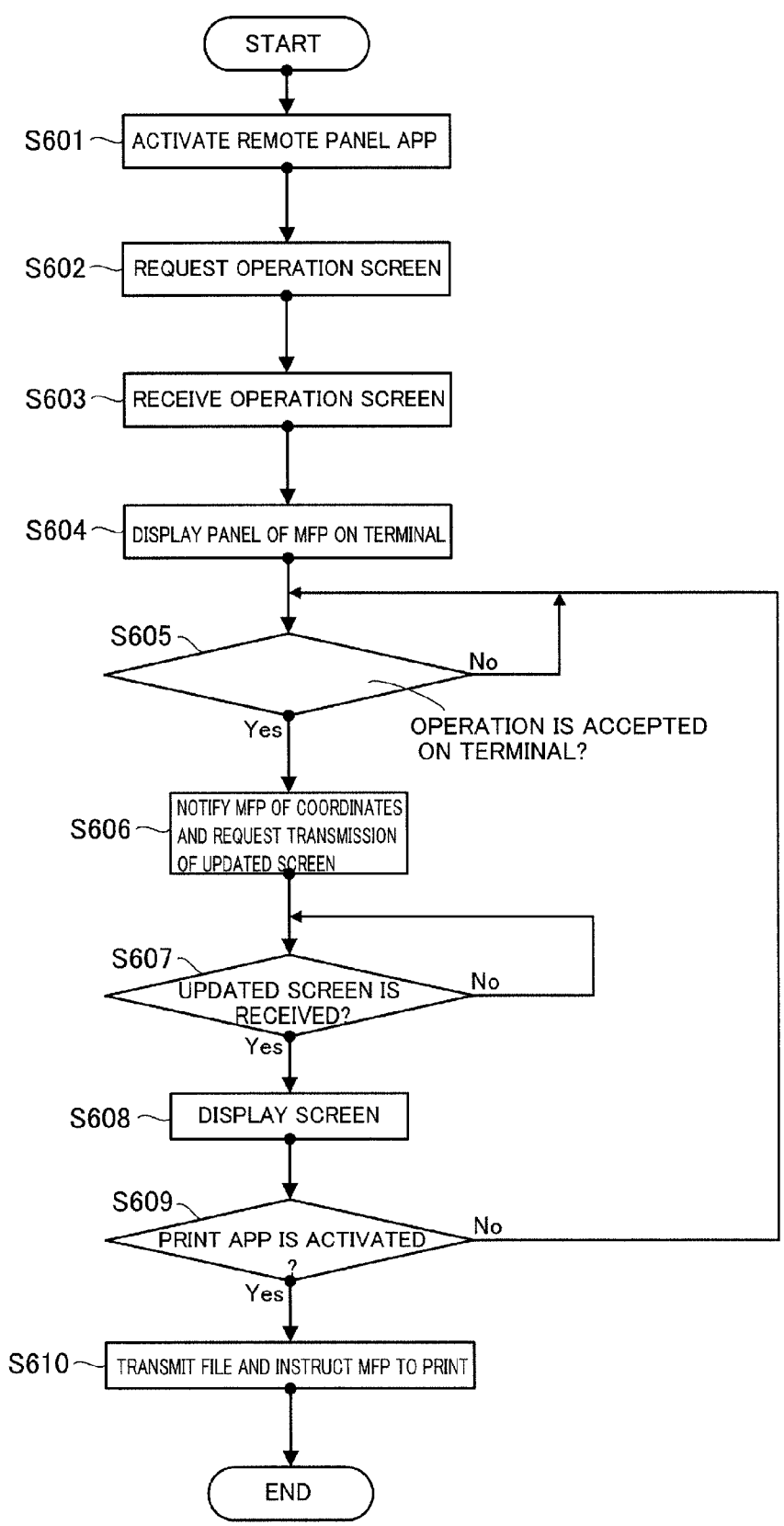
FIG. 11 is a flowchart illustrating operation of operation terminal 2 in the first embodiment of the present invention.

FIG. 11 is a flowchart illustrating operation of operation terminal 2 in the first embodiment of the present invention.

Referring to FIG. 11, CPU 201 of operation terminal 2 activates the remote app (S601) and then requests MFP 1 to transmit data of a remote operation screen (S602). CPU 201 then receives data of a remote operation screen from MFP 1 (S603) and displays the remote operation screen on touch panel 220 (the panel of the MFP on the terminal) (S604). CPU 201 then determines whether operation is accepted on operation terminal 2 (whether panel operation is performed on the terminal) (S605).

If it is determined that operation is accepted on operation terminal 2 in step S605 (Yes in S605), CPU 201 transmits the coordinates of the position where the operation is accepted to MFP 1 and requests transmission of data of an updated screen (the next screen) (S606). CPU 201 then determines whether data of an updated screen is received (S607). CPU 201 repeats the process in step S607 until it is determined that data of an updated screen is received.

If it is determined that data of an updated screen is received in step S607 (Yes in S607), CPU 201 displays an updated screen based on the received data on touch panel 220 (S608). CPU 201 then determines whether the print app is activated (S609).

If it is determined that the print app is activated in step S609 (Yes in S609), CPU 201 accepts a print execution instruction and the selection of a file saved in fixed storage device 210 or the like from the user and transmits the print execution instruction and the file to MFP 1 (S610). CPU 201 then terminates the process.

If it is determined that operation is not accepted on operation terminal 2 in step S605 (No in S605), or if it is determined that the print app is not activated in step S609 (No in S609), CPU 201 proceeds to the process in step S605.

The present embodiment provides an image forming apparatus with good operability.

In the present embodiment, when the remote panel app is activated in operation terminal 2, MFP 1 transmits a remote operation screen to operation terminal 2 to display the remote operation screen on the operation terminal 2 and accepts print settings from operation terminal 2 through the remote operation screen. When MFP 1 receives a file and a print execution instruction from operation terminal 2 through the screen of the print app (the app different from the remote panel app), MFP 1 prints the received file with the print settings accepted from operation terminal 2. Accordingly, the user can make print settings for a file not saved in MFP 1 (a file saved in operation terminal 2), on the remote operation screen. As a result, the user accustomed to operating operation panel 130 of MFP 1 can make print settings smoothly. The operability and convenience of MFP 1 is thus improved.

In the following embodiments, the operation by a user from when the user activates the remote panel app on operation terminal 2 to when print settings are completed on the remote operation screen is also referred to as remote operation. The process from steps S501 to S504 in the flowchart shown in FIG. 10 and the process from steps S601 to S608 in the flowchart shown in FIG. 11 are each also referred to as the process related remote operation.

[Second Embodiment]

In the present embodiment, MFP 1 displays a key for activating the print app (a document print key of the terminal) on operation terminal 2 together with the remote operation screen.

Figure 12:
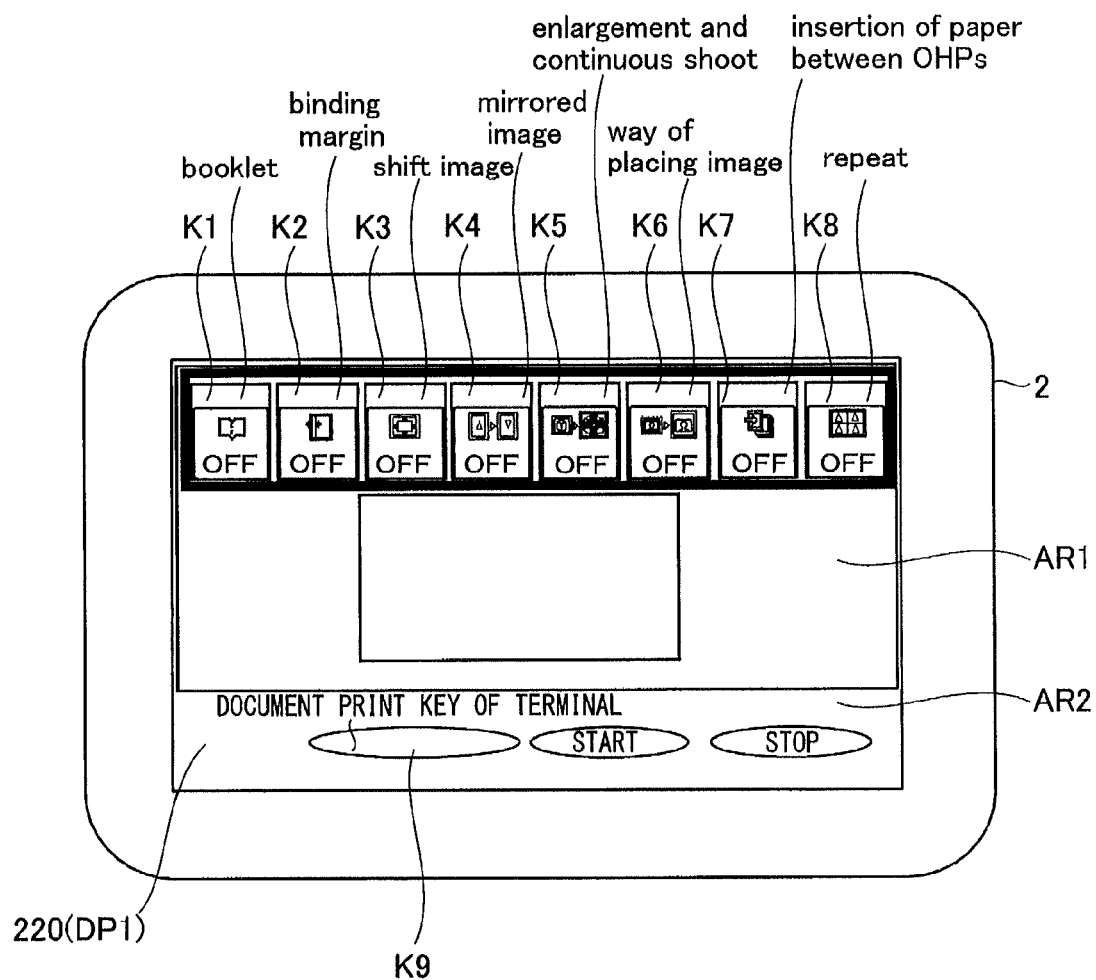
FIG. 12 is a diagram schematically showing operation terminal 2 with a remote operation screen being displayed in a second embodiment of the present invention.

FIG. 12 is a diagram schematically showing operation terminal 2 with the remote operation screen being displayed in the second embodiment of the present invention.

Referring to FIG. 12, in the present embodiment, the remote operation screen of operation terminal 2 is divided into an area AR1 for displaying the same operation screen as the one displayed on display 134 of operation panel 130 and an area AR2 for displaying the hardware keys of operation panel 130. In area AR1, keys K1 to K8 are displayed, which are included in the operation screen displayed on display 134 of operation panel 130. In area AR2, the hardware keys of operation panel 130 such as the start key and the stop key as well as a key K9 for activating the print app (document print key of the terminal) is displayed. Key K9 is not a hardware key of operation panel 130. Key K9 may be displayed in area AR1.

The user presses key K9 after making the required print settings by pressing keys K1 to K8. MFP 1 receives the coordinates of key K9 from operation terminal 2 and then allows the print app to be automatically activated on operation terminal 2.

Figure 13:
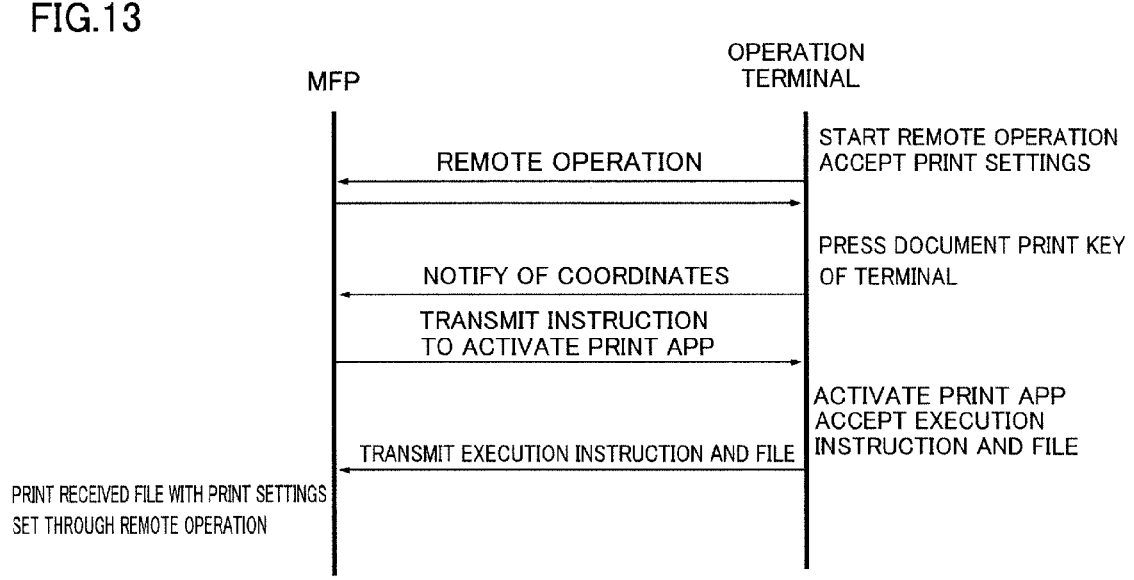
FIG. 13 is a sequence diagram showing an example of communication between MFP 1 and operation terminal 2 in the second embodiment of the present invention.

FIG. 13 is a sequence diagram showing an example of communication between MFP 1 and operation terminal 2 in the second embodiment of the present invention.

Referring to FIG. 13, when the user starts remote operation on operation terminal 2 and makes print settings, MFP 1 and operation terminal 2 each perform the process related to remote operation. Operation terminal 2 accepts a press on key K9 and then notifies MFP 1 of the coordinates of the position of key K9. MFP 1 detects that key K9 is pressed based on the given coordinates, and transmits an instruction to activate the print app to operation terminal 2. Operation terminal 2 accepts the instruction and then activates the print app. Operation terminal 2 accepts a print execution instruction and the selection of a file through the print app and then transmits the print execution instruction and the file to MFP1. MFP1 receives the print execution instruction and the file and then prints the received file with the print settings stored in SRAM 103 (the print settings set through remote operation).

Figure 14:
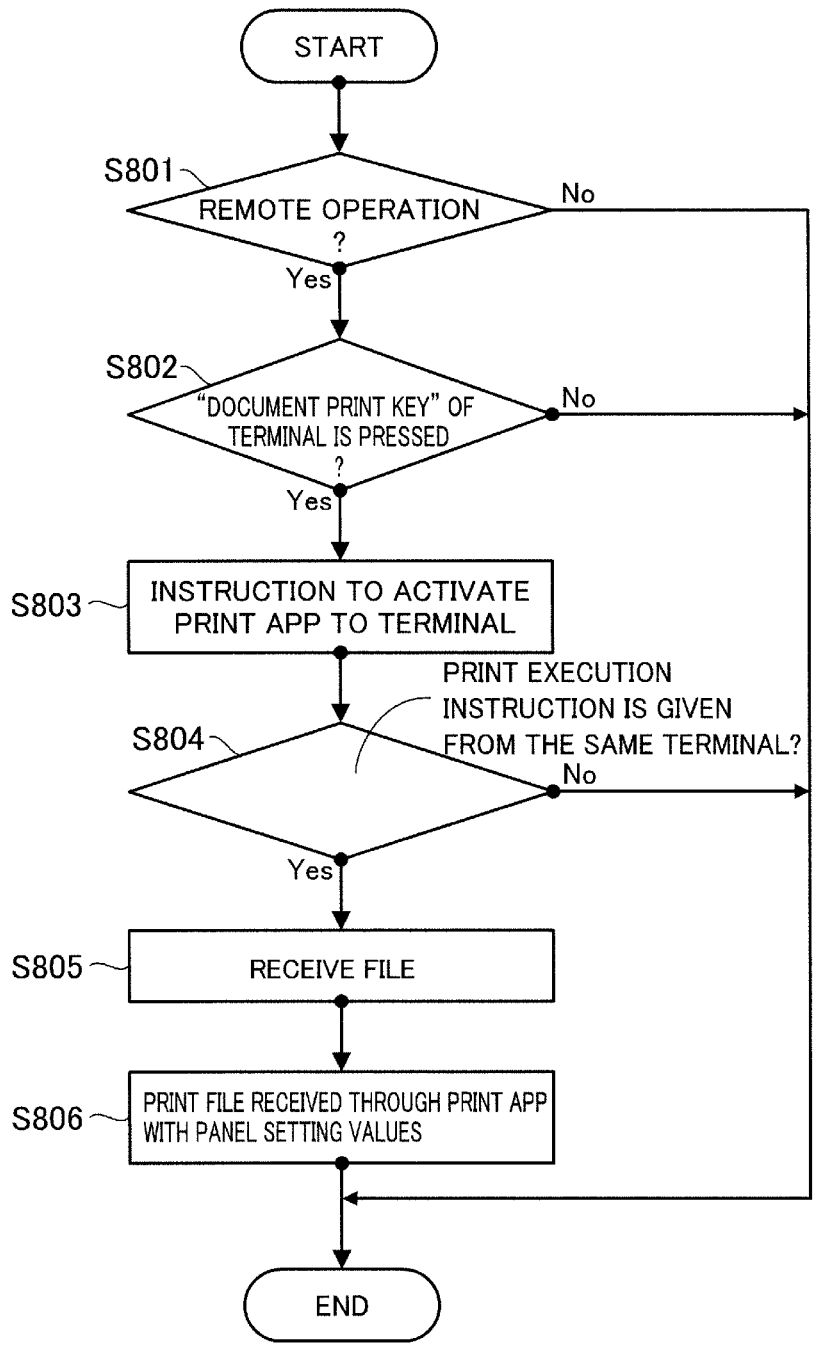
FIG. 14 is a flowchart illustrating operation of MFP 1 in the second embodiment of the present invention.

FIG. 14 is a flowchart illustrating operation of MFP 1 in the second embodiment of the present invention.

Referring to FIG. 14, CPU 101 of MFP 1 determines whether the process related to remote operation (the process in steps S501 to S504 in the flowchart shown in FIG. 10) is performed (S801).

If it is determined that the process related to remote operation is performed in step S801 (Yes in S801), CPU 101 determines whether key K9 (document print key of the terminal) is pressed on operation terminal 2 (S802).

If it is determined that key K9 is pressed in step S802 (Yes in S802), CPU 101 gives an instruction to activate the print app to operation terminal 2 (S803). CPU 101 then determines whether a print execution instruction (print request) is given from the same operation terminal 2 as the operation terminal that has transmitted the print settings (S804).

If it is determined that an execution instruction is given in step S804 (Yes in S804), CPU 101 receives a file (S805) and prints the received file with the print settings stored in SRAM 103 (panel setting values) (S806). CPU 101 then terminates the process.

If it is determined that the process related to remote operation is not performed in step S801 (No in S801), if it is determined that key K9 is not pressed in step S802 (No in S802), or if it is determined that an execution instruction is not given in step S804 (No in S804), CPU 101 terminates the process.

Figure 15:
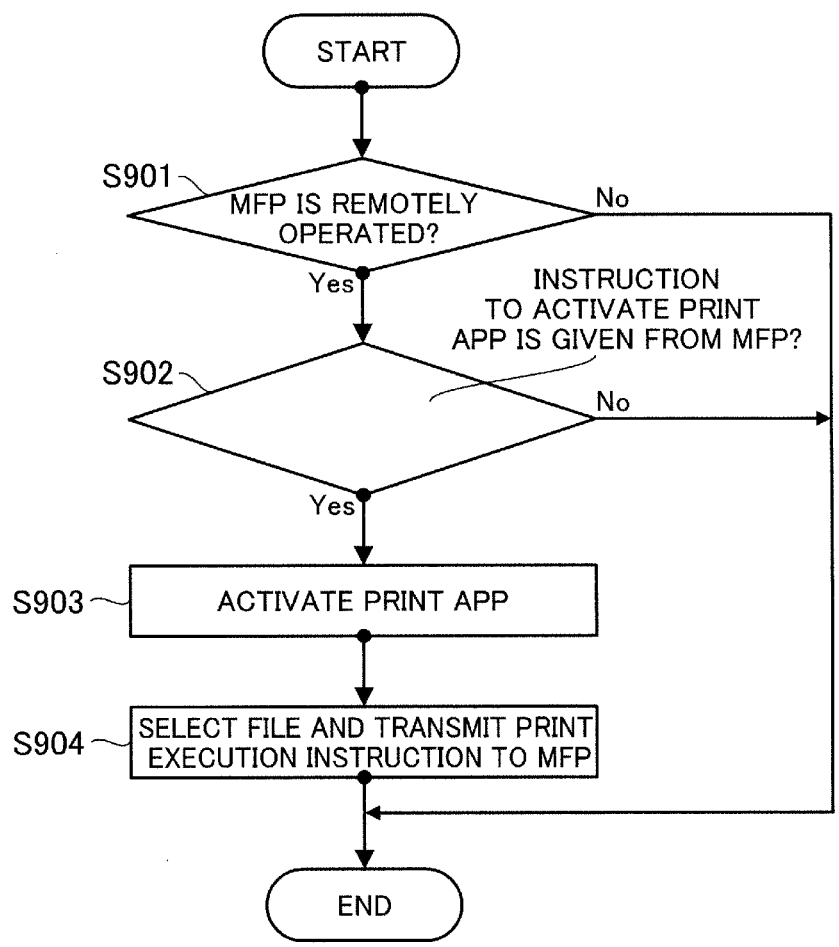
FIG. 15 is a flowchart illustrating operation of operation terminal 2 in the second embodiment of the present invention.

FIG. 15 is a flowchart illustrating operation of operation terminal 2 in the second embodiment of the present invention.

Referring to FIG. 15, CPU 201 of operation terminal 2 determines whether the process related to remote operation (the process of remotely operating the MFP, the process in steps S601 to S608 shown in FIG. 11) is performed (S901).

If it is determined that the process related to remote operation is performed in step S901 (Yes in S901), CPU 201 determines whether an instruction to activate the print app is given from MFP 1 (S902).

If it is determined that an instruction to activate the print app is given in step S902 (Yes in S902), CPU 201 activates the print app (S903). CPU 201 then accepts a print execution instruction and the selection of a file from the user and transmits the print execution instruction and the selection of a file to MFP 1 (S904). CPU 201 then terminates the process.

If it is determined that the process related to remote operation is not performed in step S901(No in S901), or if it is determined that an instruction to activate the print app is not given in step S902 (No in S902), CPU 201 terminates the process.

It is noted that the configuration of the image forming system and the operation of the image forming system except for the operation described above are the same as those of the first embodiment, and therefore, a description thereof will not be repeated.

In the present embodiment, the print app can be activated through the key of the remote operation screen, so that activation of the print app becomes easy.

[Third Embodiment]

In the present embodiment, when a print execution instruction is accepted through the print app, MFP 1 determines whether the remote panel app has been activated before the print app is activated. If the remote panel app has been activated before the print app is activated, MFP 1 prints an image with the settings accepted through the remote operation screen. If the remote panel app has not been activated before the print app is activated, MFP 1 does not print an image with the settings accepted through the remote operation screen.

Figure 16:
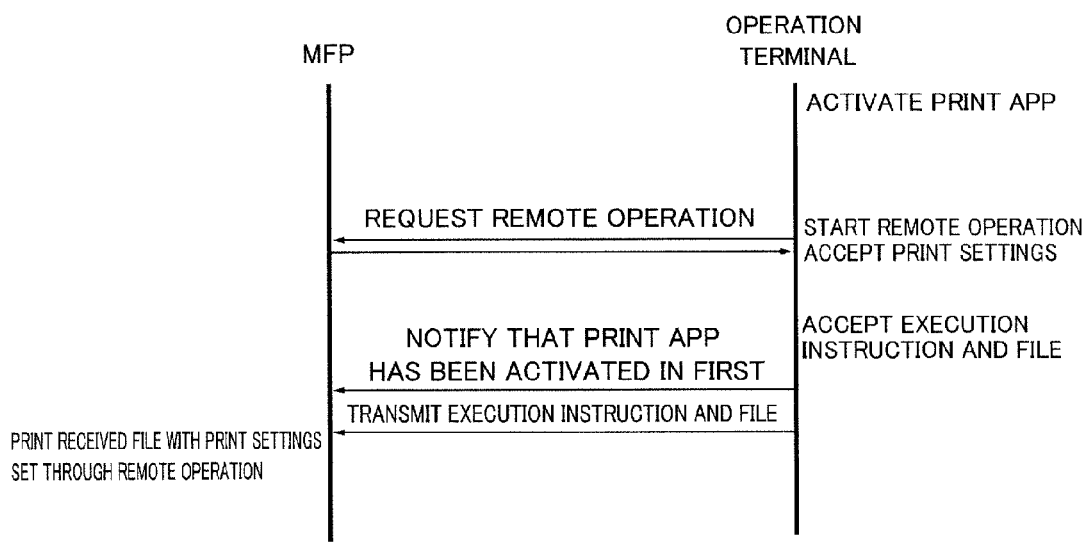
FIG. 16 is a sequence diagram showing an example of communication between MFP 1 and operation terminal 2 in a third embodiment of the present invention.

FIG. 16 is a sequence diagram showing an example of communication between MFP 1 and operation terminal 2 in the third embodiment of the present invention.

Referring to FIG. 16, operation terminal 2 activates the print app in accordance with an instruction from the user. Subsequently, when the user starts remote operation and makes print settings, MFP 1 and operation terminal 2 each perform the process related to remote operation. Operation terminal 2 accepts a print execution instruction and the selection of a file through the print app, notifies MFP 1 that the print app has been activated before the remote panel app is activated (before the remote operation screen is displayed), and transmits the print execution instruction and the file to MFP 1. MFP 1 accepts the notice that the print app has been activated earlier, receives the execution instruction and the file, and then prints the received file with the print settings stored in SRAM 103 (the print settings set through remote operation).

Operation terminal 2 may accept the selection of a file to be printed from the user before the remote panel app is activated or may accept it from the user after the remote panel app is activated.

Figure 17:
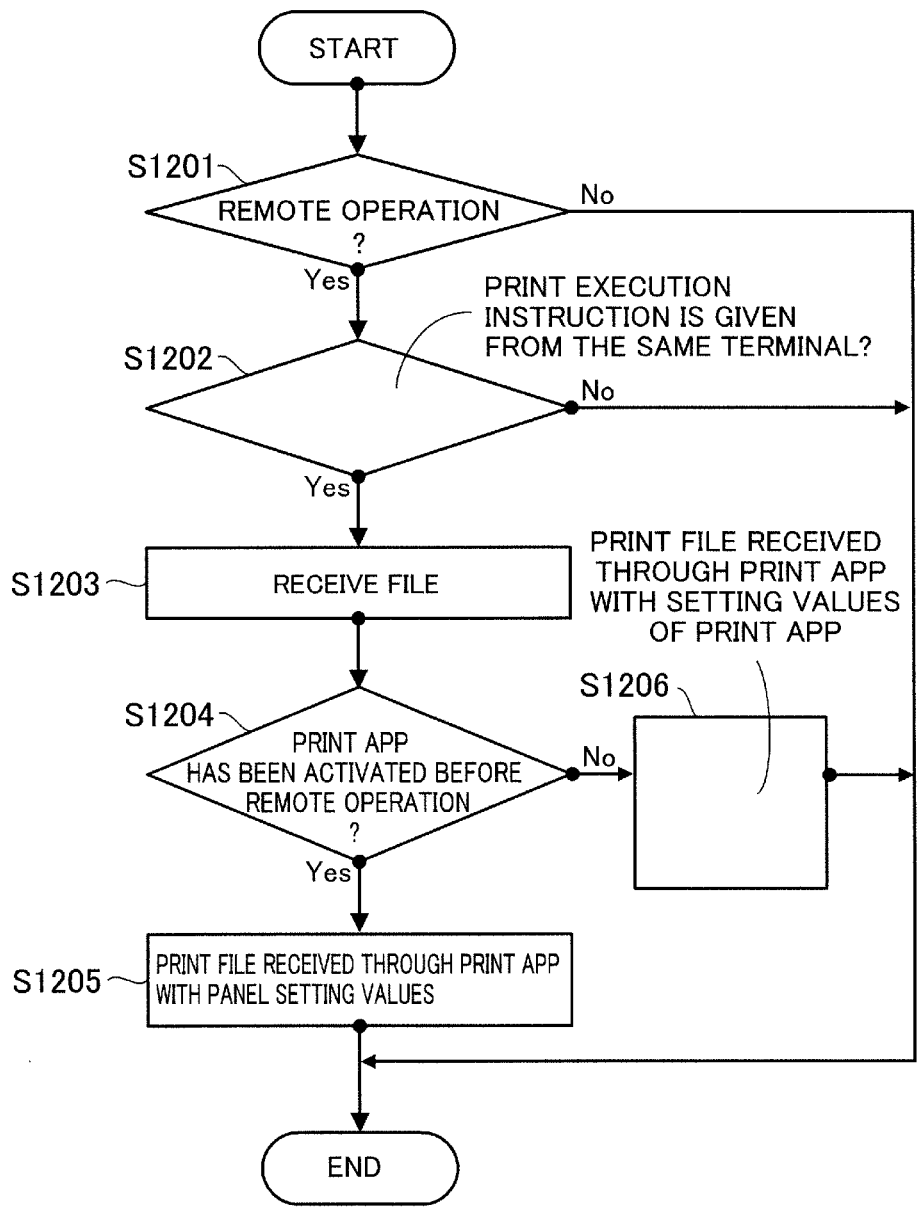
FIG. 17 is a flowchart illustrating operation of MFP 1 in the third embodiment of the present invention.

FIG. 17 is a flowchart illustrating operation of MFP 1 in the third embodiment of the present invention.

Referring to FIG. 17, CPU 101 of MFP 1 determines whether the process related to remote operation (the process in steps S501 to S504 in the flowchart shown in FIG. 10) is performed (S1201).

If it is determined that the process related to remote operation is performed in step S1201 (Yes in S1201), CPU 101 determines whether a print execution instruction (print request) is given from the same operation terminal 2 as the operation terminal that has transmitted the print settings (S1202).

If it is determined that an execution instruction is given in step S1202 (Yes in S1202), CPU 101 receives a file (S1203). CPU 101 then determines whether a notice that the print app has been activated before the remote panel app is activated is received from operation terminal 2 (S1204).

If it is determined that a notice that the print app has been activated is received in step S1204 (Yes in S1204), CPU 101 prints the file with the print settings stored in SRAM 103 (panel setting values) (S1205) and terminates the process. On the other hand, if it is determined that a notice that the print app has been activated is not received in step S1204 (No in S1204), CPU 101 prints the file received through the print app with the setting values of the print app (S1206) and terminates the process.

If it is determined that the process related to remote operation is not performed in step S1201 (No in S1201), or if it is determined that an execution instruction is not given in step S1202 (No in S1202), CPU 101 terminates the process.

Figure 18:
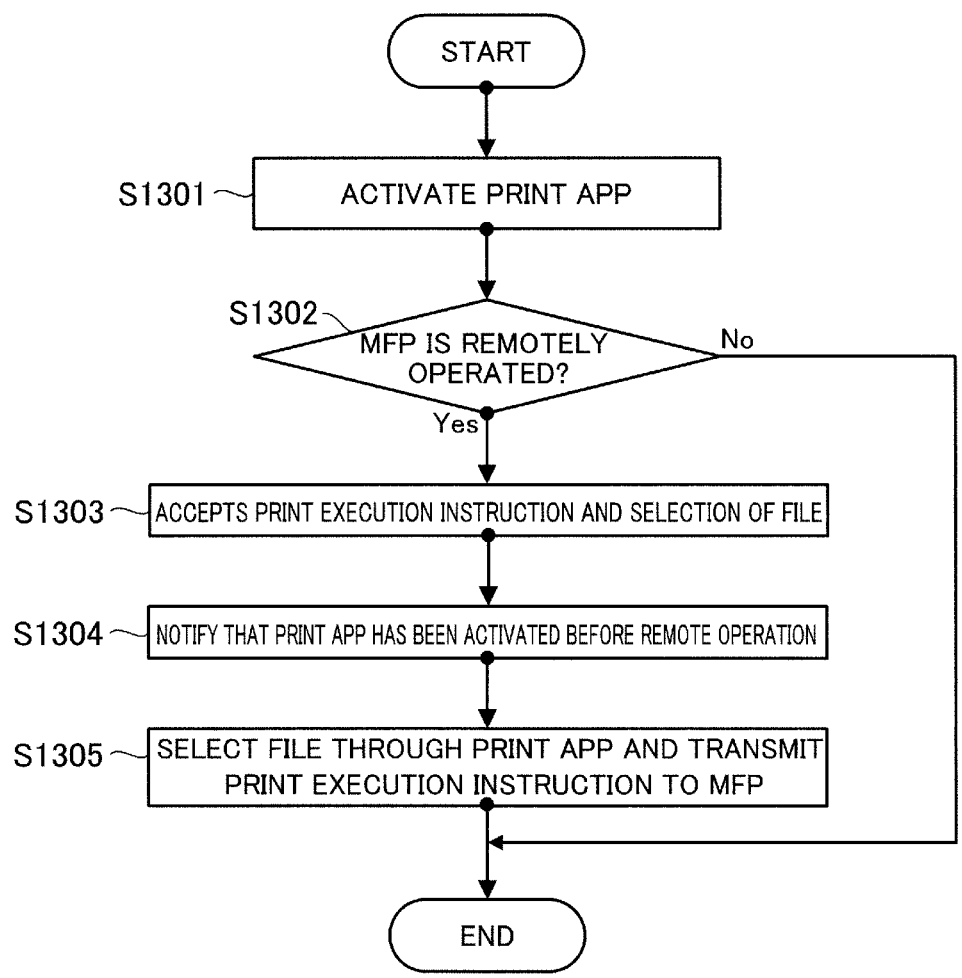
FIG. 18 is a flowchart illustrating operation of operation terminal 2 in the third embodiment of the present invention.

FIG. 18 is a flowchart illustrating operation of operation terminal 2 in the third embodiment of the present invention.

Referring to FIG. 18, CPU 201 of operation terminal 2 activates the print app in accordance with the user's instruction (S1301) and determines whether the process related to remote operation (the process of remotely operating the MFP, the process in steps S601 to S608 shown in FIG. 11) is performed (S1302).

If it is determined that the process related to remote operation is performed in step S1302 (Yes in S1302), CPU 201 accepts a print execution instruction and the selection of a file from the user (S1303). CPU 201 then notifies MFP 1 that the print app has been activated before the remote panel app is activated (S1304) and transmits the print execution instruction and the file to MFP 1 (S1305). CPU 201 then terminates the process.

It is noted that the configuration of the image forming system and the operation of the image forming system except for the operation described above are the same as those of the first embodiment, and therefore, a description thereof will not be repeated.

In the present embodiment, the settings made on the remote operation screen before the print app is activated are not reflected in printing, so that an error in print settings can be avoided.

In the first to third embodiments, MFP 1 may print the received file with the print settings stored in SRAM 103 only when a print execution instruction is accepted through the screen of the print app, with the remote operation screen being displayed on operation terminal 2. MFP 1 does not have to print the received file with the print settings stored in SRAM 103 if a print execution instruction is accepted through the screen of the print app, with the remote operation screen not being displayed on operation terminal 2. In this case, it is possible that the file is printed with the print settings on the print app that are transmitted simultaneously when the print execution instruction is accepted on the print app.

[Fourth Embodiment]

In the following fourth to seventh embodiments, MFP 1 accepts print settings from the remote panel app of operation terminal 2 and accepts a print execution instruction without selection of an image (that is, only a print execution instruction is transmitted from the remote panel app without simultaneous transmission of a file), and thereafter acquires an image through the print app from the same operation terminal 2 as the operation terminal that accepts the print settings and the print execution instruction, or by means other than the print app, for example, attachment to an email or FTP. In this case, MFP 1 prints the image with the settings that have been accepted from operation terminal 2.

Figure 19:
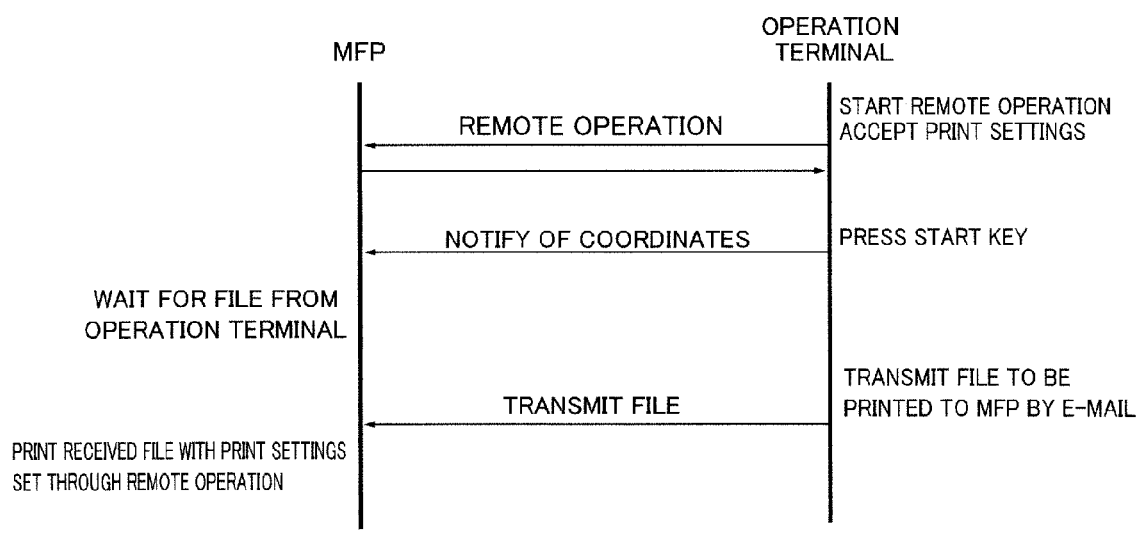
FIG. 19 is a sequence diagram showing an example of communication between MFP 1 and operation terminal 2 in a fourth embodiment of the present invention.

FIG. 19 is a sequence diagram showing an example of communication between MFP 1 and operation terminal 2 in the fourth embodiment of the present invention.

Referring to FIG. 19, when the user starts remote operation on operation terminal 2 and makes print settings, MFP 1 and operation terminal 2 each perform the process related to remote operation. When the start key of the remote operation screen (for example, the start key of the remote operation screen shown in FIG. 12) is pressed without selection of a file, operation terminal 2 notifies MFP 1 of the coordinates of the position of the start key. MFP 1 detects that the start key is pressed based on the given coordinates and accepts a print execution instruction. At the point of time when MFP 1 accepts the print execution instruction, a target to be printed has not yet been decided. Therefore, MFP 1, accepting a print execution instruction, waits for transmission of a file from operation terminal 2 without performing printing. Operation terminal 2 transmits a file to be printed to MFP 1, for example, by email in accordance with an instruction from the user. When a file is received from the same operation terminal 2 as the operation terminal that has transmitted the print settings, MFP 1 prints the received file with the print settings stored in SRAM 103 (the print settings set through remote operation).

Figure 20:
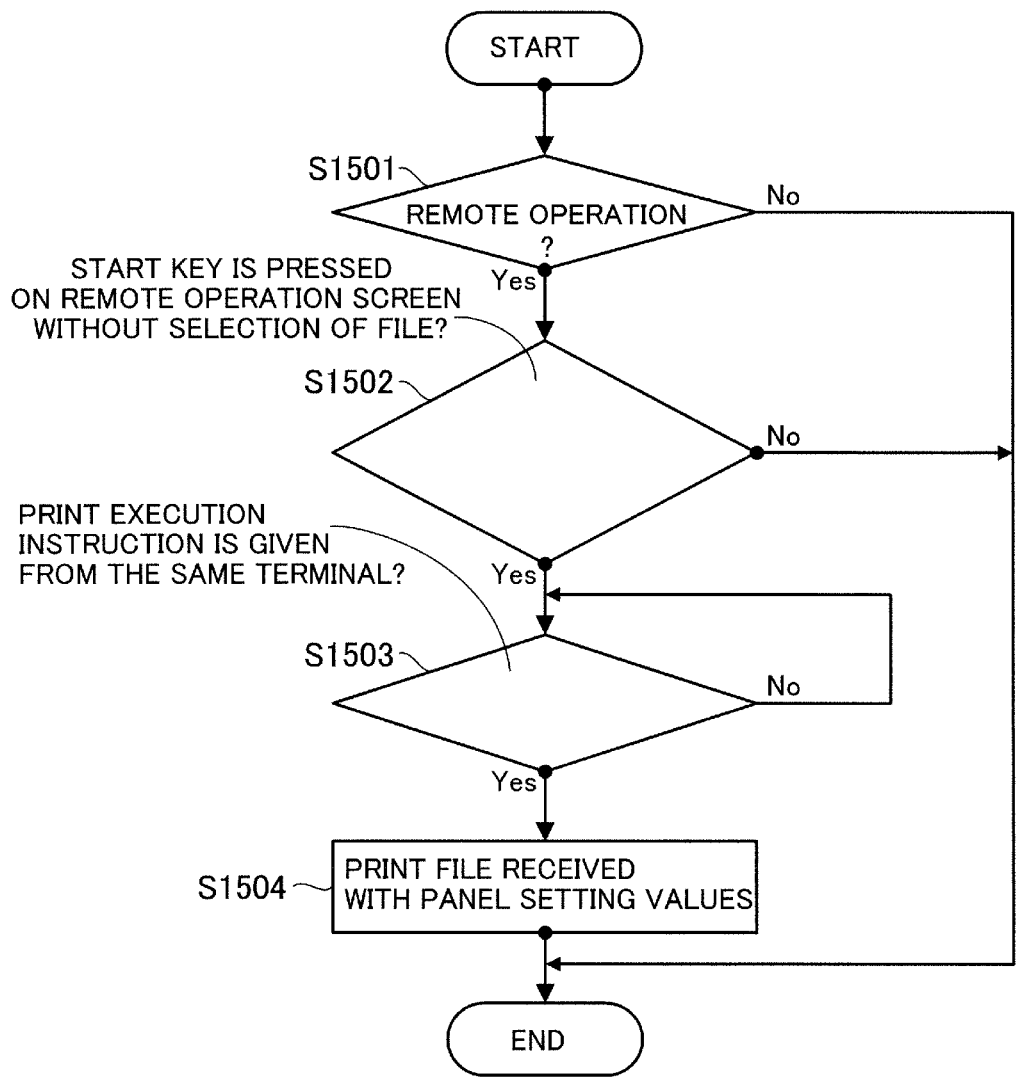
FIG. 20 is a flowchart illustrating operation of MFP 1 in the fourth embodiment of the present invention.

FIG. 20 is a flowchart illustrating operation of MFP 1 in the fourth embodiment of the present invention.

Referring to FIG. 20, CPU 101 of MFP 1 determines whether the process related to remote operation (the process in steps S501 to S504 in the flowchart shown in FIG. 10) is performed (S1501).

If it is determined that the process related to remote operation is performed in step S1501 (Yes in S1501), CPU 101 determines whether the start key is pressed on the remote operation screen of operation terminal 2 without selection of a file (S1502).

If it is determined that the start key is pressed in step S1502 (Yes in S1502), CPU 101 determines whether a file is received from the same operation terminal 2 as the operation terminal that has transmitted the print settings (S1503). CPU 101 repeats the process in step S1503 until it is determined that a file is received.

If it is determined that a file is received in step S1503 (Yes in S1503), CPU 101 prints the received file with the print settings stored in SRAM 103 (panel setting values) (S1504) and terminates the process.

If it is determined that the process related to remote operation is not performed in step S1501 (No in S1501), or if it is determined that the start key is not pressed in step S1502 (No in S1502), CPU 101 terminates the process.

Figure 21:
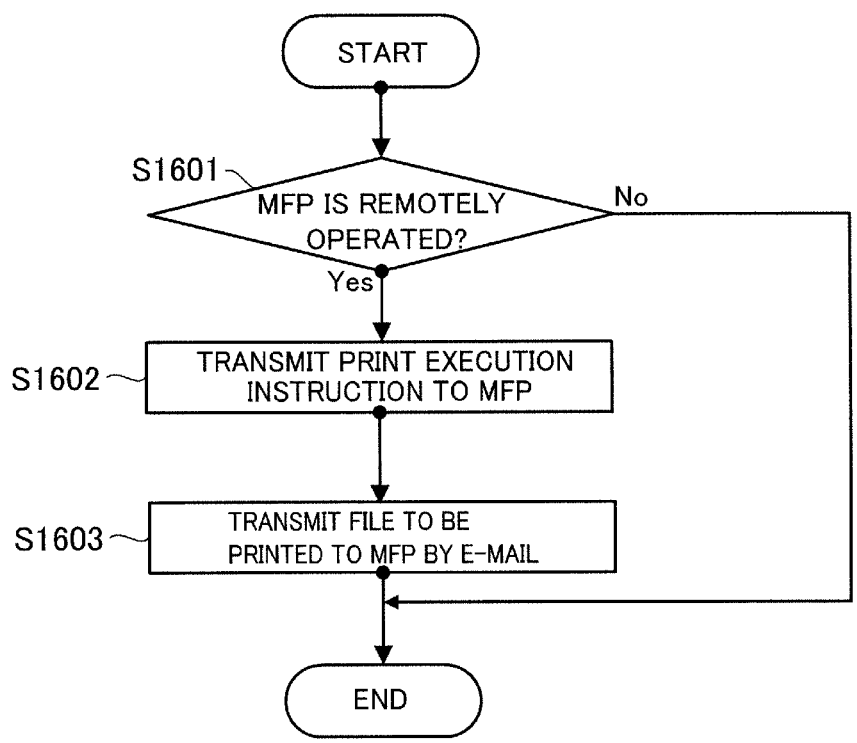
FIG. 21 is a flowchart illustrating operation of operation terminal 2 in the fourth embodiment of the present invention.

FIG. 21 is a flowchart illustrating operation of operation terminal 2 in the fourth embodiment of the present invention.

Referring to FIG. 21, CPU 201 of operation terminal 2 determines whether the process related to remote operation (the process of remotely operating the MFP, the process in steps S601 to S608 shown in FIG. 11) is performed (S1601).

If it is determined that the process related to remote operation is performed in step S1601 (Yes in S1601), CPU 201 accepts a print execution instruction from the user and transmits the print execution instruction to MFP 1 (S1602). CPU 201 thereafter transmits a file to be printed to MFP 1 by email (S1603) and terminates the process.

If it is determined that the process related to remote operation is not performed in step S1601 (No in S1601), CPU 201 terminates the process.

It is noted that the configuration of the image forming system and the operation of the image forming system except for the operation described above are the same as those of the first embodiment, and therefore, a description thereof will not be repeated.

In the present embodiment, the user only has to send a file that the user wishes to print to MFP 1 after making print settings and giving an execution instruction on operation terminal 2, thereby printing the file with the print settings that have been made. In particular when MFP 1 accepts a print execution instruction by pressing the start key of the remote operation screen of operation terminal 2, activation of the print app on operation terminal becomes unnecessary.

[Fifth Embodiment]

In the present embodiment, MFP 1 accepts print settings from operation terminal 2 and accepts a print execution instruction without selection of an image and thereafter receives a notice from operation terminal 2 to indicate that operation irrelevant to transmission of an image is performed at operation terminal 2, before acquiring an image. In this case, MFP 1 discards the settings accepted from operation terminal 2.

Figure 22:
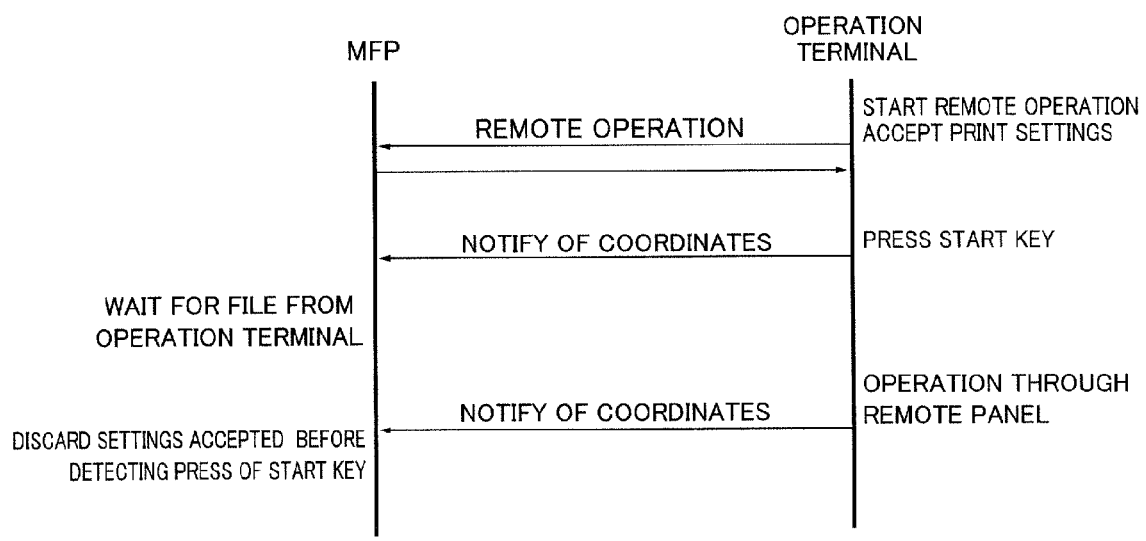
FIG. 22 is a sequence diagram showing an example of communication between MFP 1 and operation terminal 2 in a fifth embodiment of the present invention.

FIG. 22 is a sequence diagram showing an example of communication between MFP 1 and operation terminal 2 in the fifth embodiment of the present invention.

Referring to FIG. 22, when the user starts remote operation on operation terminal 2 and makes print settings, MFP 1 and operation terminal 2 each perform the process related to remote operation. When the start key of the remote operation screen (for example, the start key of the remote operation screen shown in FIG. 12) is pressed without selection of a file, operation terminal 2 notifies MFP 1 of the coordinates of the position of the start key. MFP 1 detects that the start key is pressed based on the given coordinates and accepts a print execution instruction. At the point of time when MFP 1 accepts a print execution instruction, a target to be printed has not yet been decided. MFP 1 therefore waits for transmission of a file from operation terminal 2 without performing printing. While MFP 1 is waiting for transmission of a file, if operation terminal 2 accepts a press on a key irrelevant to transmission of an image (any one of keys K1 to K8 in remote operation screen DP1 shown in FIG. 6), operation terminal 2 notifies MFP 1 of the coordinates of the position of the operation. MFP 1 detects the press on the key irrelevant to transmission of an image and then determines that a request for cancelling printing is made from the user, and discards the settings accepted from operation terminal 2 before the press on the start key is detected. Even when receiving a file from operation terminal 2 through the print app after discarding the settings, MFP 1 does not print the file with the settings accepted from operation terminal 2.

Figure 23:
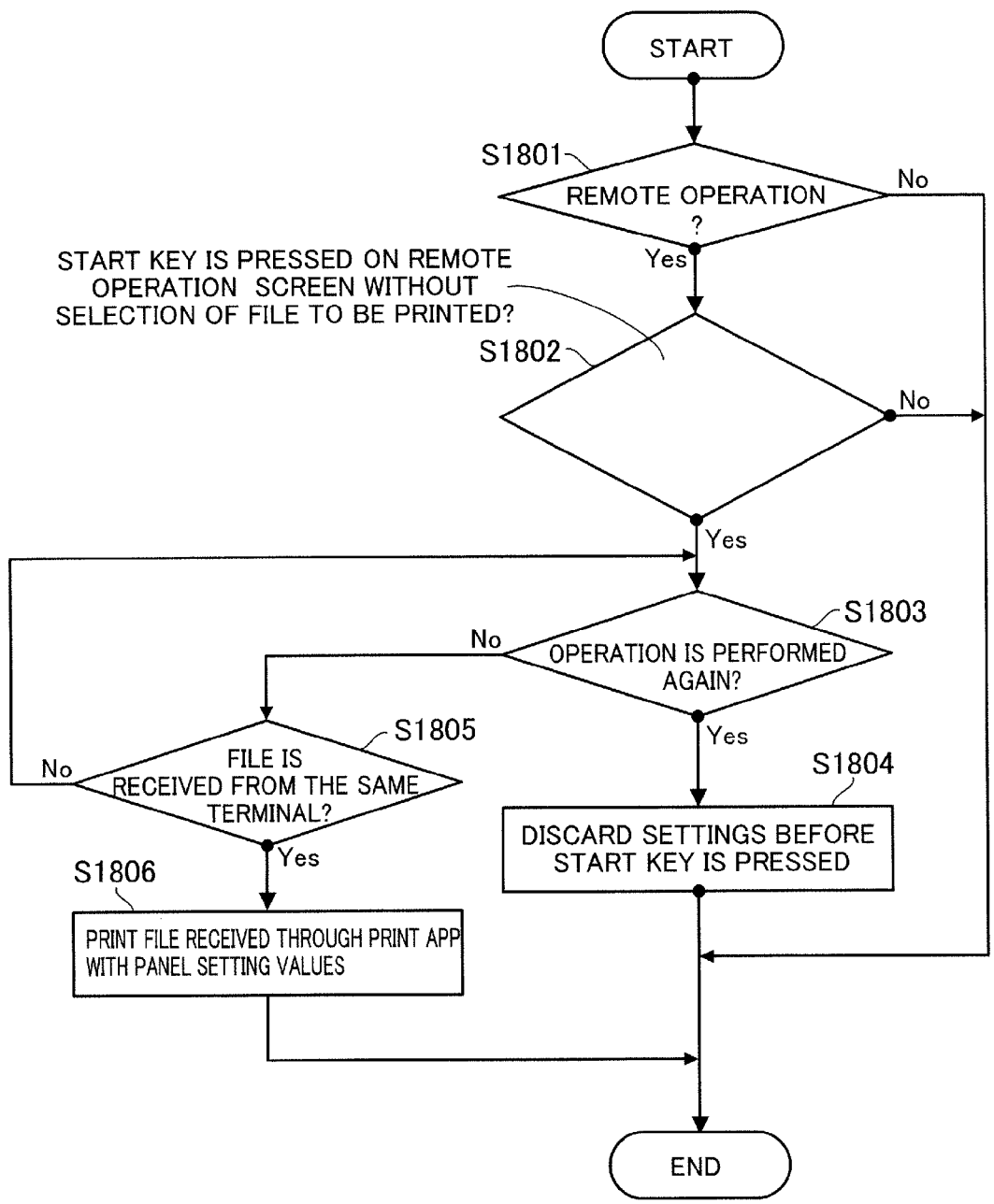
FIG. 23 is a flowchart illustrating operation of MFP 1 in the fifth embodiment of the present invention.

FIG. 23 is a flowchart illustrating operation of MFP 1 in the fifth embodiment of the present invention.

Referring to FIG. 23, CPU 101 of MFP 1 determines whether the process related to remote operation (the process in steps S501 to S504 in the flowchart shown in FIG. 10) is performed (S1801).

If it is determined that the process related to remote operation is performed in step S1801 (Yes in S1801), CPU 101 determines whether the start key is pressed on the remote operation screen of operation terminal 2 without selection of a file (S1802).

If it is determined that the start key is pressed in step S1802 (Yes in S1802), CPU 101 determines whether operation irrelevant to transmission of an image is performed on the remote operation screen of operation terminal 2 (S1803).

If it is determined that operation is performed in step S1803 (Yes in S1803), CPU 101 discards the settings accepted from operation terminal 2 before the start key is pressed (S1804), and terminates the process.

If it is determined that the process related to remote operation is not performed in step S1801 (No in S1801), or if it is determined that the start key is not pressed in step S1802 (No in S1802), CPU 101 terminates the process.

If it is determined that operation is not performed in step S1803 (No in S1803), CPU 101 determines whether a file is received from the same operation terminal 2 as the operation terminal that has transmitted the print settings (S1805).

If it is determined that a file is received in step S1805 (Yes in S1805), CPU 101 prints the received file with the print settings stored in SRAM 103 (panel setting values) (S1806) and terminates the process.

If it is determined that a file is not received in step S1805 (No in S1805), CPU 101 proceeds to the process in step S1803.

It is noted that the configuration of the image forming system and the operation of the image forming system except for the operation described above are the same as those of the fourth embodiment, and therefore, a description thereof will not be repeated.

In the present embodiment, it can be avoided that MFP 1 keeps waiting for transmission of a file from operation terminal 2 when MFP 1 does not receive a file from operation terminal 2. When a user makes a setting error, the user can cancel the settings by performing operation irrelevant to transmission of an image on the remote operation screen, if the file that the user wishes to print has not yet been transmitted.

[Sixth Embodiment]

In the present embodiment, MFP 1 accepts print settings through the remote operation screen of operation terminal 2 and accepts a print execution instruction without selection of a file, and thereafter receives a notice from operation terminal 2 to indicate that the activation of the remote panel app is terminated, before acquiring an image. In this case, MFP 1 discards the settings accepted from operation terminal 2.

Figure 24:
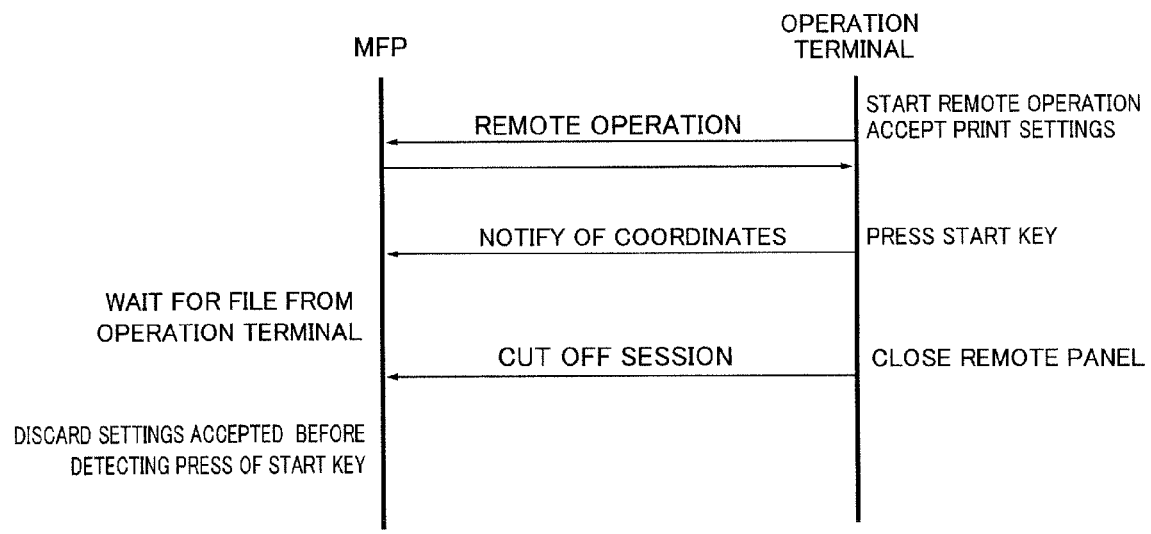
FIG. 24 is a sequence diagram showing an example of communication performed between MFP 1 and operation terminal 2 in a sixth embodiment of the present invention.

FIG. 24 is a sequence diagram showing an example of communication between MFP 1 and operation terminal 2 in the sixth embodiment of the present invention.

Referring to FIG. 24, when the user starts remote operation on operation terminal 2 and makes print settings, MFP 1 and operation terminal 2 each perform the process related to remote operation. When the start key of the remote operation screen (for example, the start key of the remote operation screen shown in FIG. 12) is pressed without selection of a file, operation terminal 2 notifies MFP 1 of the coordinates of the position of the start key. MFP 1 detects that the start key is pressed based on the given coordinates and accepts a print execution instruction. At the point of time when MFP 1 accepts a print execution instruction, a target to be printed has not yet been decided. Therefore, MFP 1, accepting a print execution instruction, waits for transmission of a file from operation terminal 2 without performing printing. Operation terminal 2 cuts off the session with MFP 1 in relation to the remote operation if operation of closing the remote operation screen (the screen of the remote panel app) while MFP 1 is waiting for transmission of a file. MFP 1 detects that the session with operation terminal 2 is cut off, determines that a request for cancelling printing is given from the user, and discards the settings accepted from operation terminal 2 before the press on the start key is detected. Even when receiving a file through the print app after discarding the settings, MFP 1 does not print the file with the settings accepted from operation terminal 2.

Figure 25:
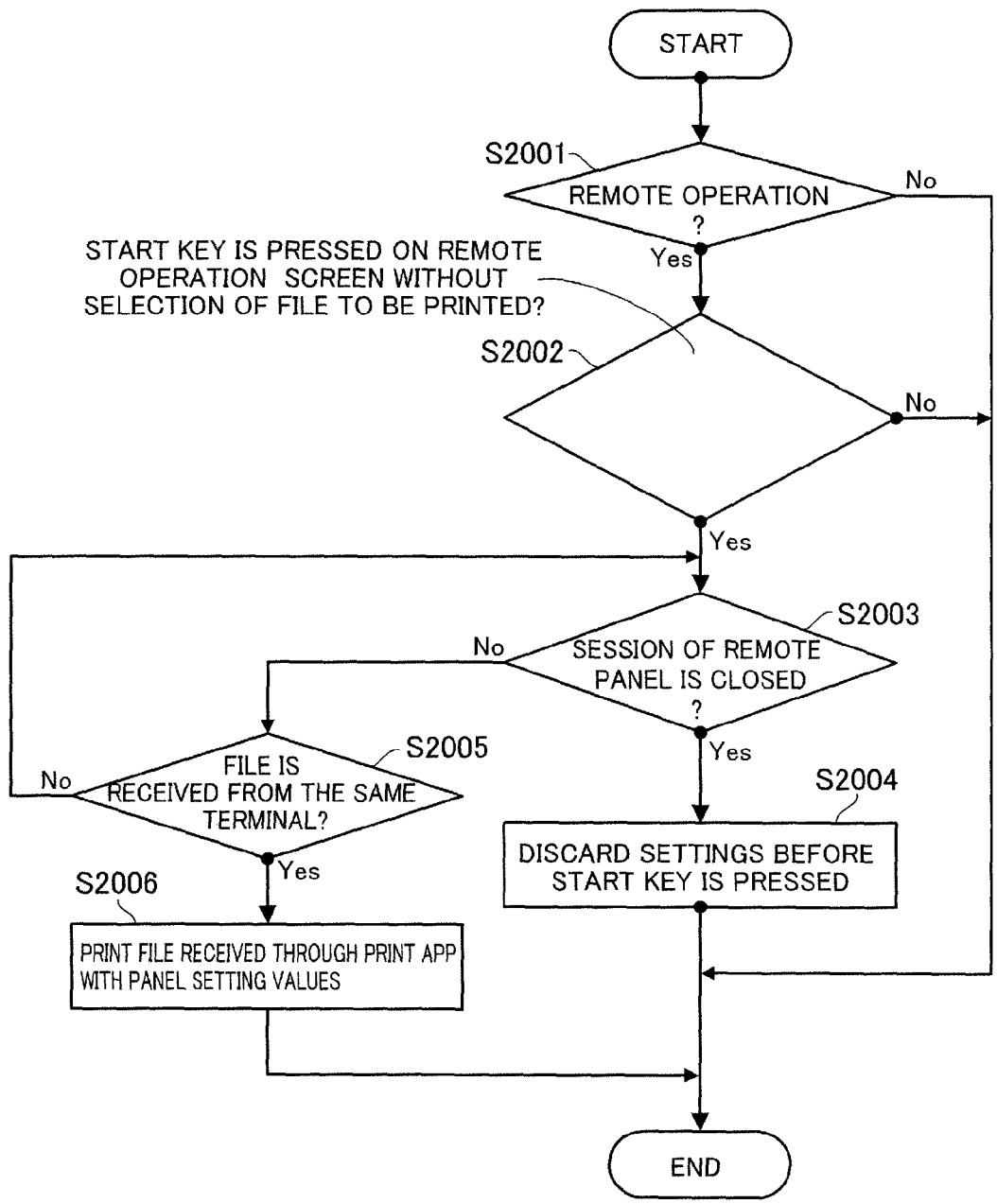
FIG. 25 is a flowchart illustrating operation of MFP 1 in the sixth embodiment of the present invention.

FIG. 25 is a flowchart illustrating operation of MFP 1 in the sixth embodiment of the present invention.

Referring to FIG. 25, CPU 101 of MFP 1 determines whether the process related to remote operation (the process in steps S501 to S504 in the flowchart shown in FIG. 10) is performed (S2001).

If it is determined that the process related to remote operation is performed in step S2001 (Yes in S2001), CPU 101 determines whether the start key is pressed on the remote operation screen of operation terminal 2 without selection of a file (S2002).

If it is determined that the start key is pressed in step S2002 (Yes in S2002), CPU 101 determines whether the session with operation terminal 2 is cut off (whether the session of the remote panel is closed) (S2003).

If it is determined that the session with operation terminal 2 is cut off in step S2003 (Yes in S2003), CPU 101 discards the settings accepted from operation terminal 2 before the start key is pressed (S2004), and terminates the process.

If it is determined that the process related to remote operation is not performed in step S2001 (No in S2001), or if it is determined that the start key is not pressed in step S2002 (No in S2002), CPU 101 terminates the process.

If it is determined that operation is not performed in step S2003 (No in S2003), CPU 101 determines whether a file is received from the same operation terminal 2 as the operation terminal that has transmitted the print settings (S2005).

If it is determined that a file is received in step S2005 (Yes in S2005), CPU 101 prints the received file with the print settings stored in SRAM 103 (panel setting values) (S2006) and terminates the process.

If it is determined that a file is not received in step S2005 (No in S2005), CPU 101 proceeds to the process in step S2003.

It is noted that the configuration of the image forming system and the operation of the image forming system except for the operation described above are the same as those of the fourth embodiment, and therefore, a description thereof will not be repeated.

In the present invention, it can be avoided that MFP 1 keeps waiting for transmission of a file from operation terminal 2 when MFP 1 does not receive a file from operation terminal 2. When the user makes a setting error, the user can cancel the settings by closing the screen of the remote panel app, if the file that the user wishes to print has not yet been transmitted.

[Seventh Embodiment]

In the present embodiment, MFP 1 acquires a plurality of images from the same operation terminal 2 as the operation terminal that has accepted print settings and a print execution instruction, before a predetermined time has elapsed since the print settings are accepted from operation terminal 2 and the print execution instruction is accepted without selection of an image. In this case, MFP 1 prints all the images with the settings accepted from operation terminal 2.

Figure 26:
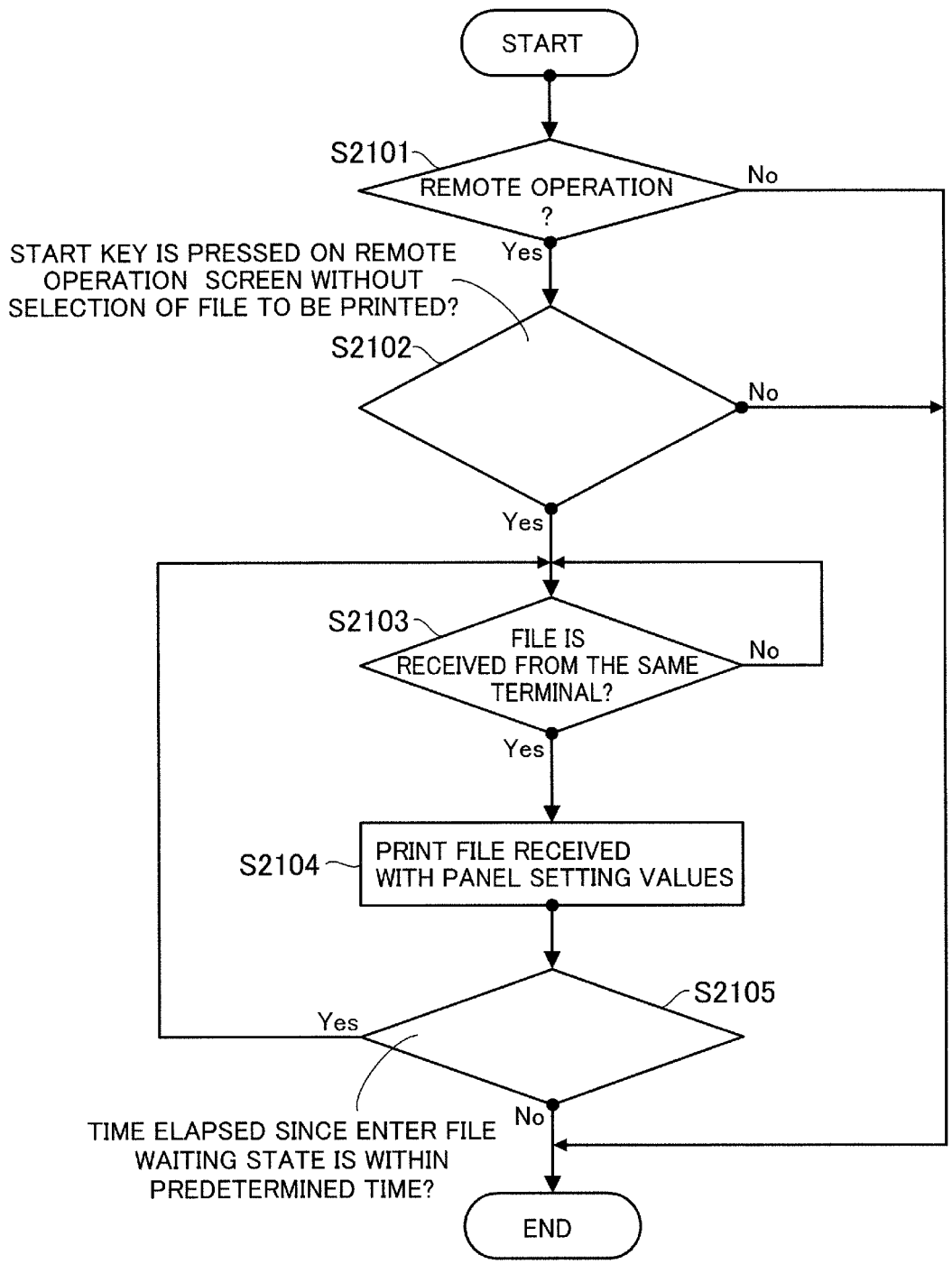
FIG. 26 is a flowchart illustrating operation of MFP 1 in a seventh embodiment of the present invention.

FIG. 26 is a flowchart illustrating operation of MFP 1 in the seventh embodiment of the present invention.

Referring to FIG. 26, CPU 101 of MFP 1 determines whether the process related to remote operation (the process in steps S501 to S504 in the flowchart shown in FIG. 10) is performed (S2101).

If it is determined that the process related to remote operation is performed in step S2101 (Yes in S2101), CPU 101 determines whether the start key is pressed on the remote operation screen of operation terminal 2 without selection of a file (S2102).

If it is determined that the start key is pressed in step S2102 (Yes in S2102), CPU 101 enters a file waiting state and determines whether a file is received from the same operation terminal 2 that has transmitted the print settings (S2103). CPU 101 repeats the process in step S2103 until it is determined that a file is received.

If it is determined that a file is received in step S2103 (Yes in S2103), CPU 101 prints the received file with the print settings stored in SRAM 103 (panel setting values) (S2104). CPU 101 then determines whether the time elapsed since CPU 101 enters the file waiting state is within a predetermined time (S2105).

If it is determined that it is within a predetermined time in step S2105 (Yes in S2105), CPU 101 proceeds to the process in step S2103 and keeps the file waiting state. On the other hand, if it is determined that it exceeds a predetermined time (for example, one minute) in step S2105 (No in S2105), CPU 101 terminates the process.

If it is determined that the process related to remote operation is not performed in step S2101 (No in S2101), or if it is determined that the start key is not pressed in step S2102 (No in S2102), CPU 101 terminates the process.

It is noted that the configuration of the image forming system and the operation of the image forming system except for the operation described above are the same as those of the fourth embodiment, and therefore, a description thereof will not be repeated.

In the present embodiment, if MFP 1 is in the file waiting state, MFP 1 prints all the received files with the print settings accepted through the remote operation screen. Accordingly, when a plurality of files are to be printed with the same print settings, it is not necessary to make print settings for each file.

In the fourth to seventh embodiments, a file may be transmitted from operation terminal 2 to MFP 1 by any method. A file may be transmitted by email or using FTP (File Transfer Protocol) or PSWC (PageScope Web Connection). In particular when a plurality of files are transmitted as in the seventh embodiment, a plurality of files can be transmitted by transmission methods different from each other (for example, by email and by PSWC). The length of the time during which MFP 1 is in the file waiting state may be set by the user.

PSWC is a function provided by an MFP that allows prints settings by accessing the URL of the MFP. When using this function, the user only has to select a file with a direct print function, so that the MFP starts printing without an instruction to start printing on PSWC.

[Eighth Embodiment]

In the following eighth to eleventh embodiments, MFP 1 accepts print settings through both the remote operation screen and the screen of the print app. In a predetermined case, MFP 1 changes the settings accepted through the remote operation screen to the settings accepted through the screen of the print app and prints an image with the changed settings.

In the present embodiment, MFP 1 changes settings if the settings accepted through the remote operation screen are the same as the initial settings (default values) in the remote operation screen and the settings accepted through the screen of the print app are different from the settings accepted through the remote operation screen.

FIG. 27 is a table schematically showing print settings employed by MFP 1 in a case where print settings are accepted through both the remote operation screen and the screen of the print app.

Referring to FIG. 27, it is assumed that the settings accepted by MFP 1 through the remote screen (the remote settings) are five copies, sort print, no collate, paper feed tray auto-select, double-sided print, and portrait print, and that the settings accepted through the screen of the print app (the print app settings) are one copy, sort print, no collate, select paper feed tray 1, double-sided print, and portrait print. It is assumed that the initial settings in the remote operation screen (panel initial values) are one copy, sort print, no collate, paper feed tray auto-select, single-sided print, and portrait print. The initial settings in the remote operation screen are normally stored in fixed storage device 110.

In this case, of the contents of the items of the settings accepted through the remote operation screen, the contents of the items of the sort setting, the collate setting, the paper feed tray setting, and the print orientation are the same as the contents of the initial settings in the remote operation screen. Of the contents of the items of the sort setting, the collate setting, the paper feed tray setting, and the print orientation that are accepted through the screen of the print app, the content of the item of paper feed tray (the item hatched in the table) is different from the content of the item of the settings accepted through the remote operation screen. MFP 1 therefore changes the content of the item of paper feed tray in the items of the actual print settings, from "paper feed tray auto-select" accepted through the remote operation screen to "select paper feed tray 1" accepted through the screen of the print app.

As for the items of the settings other than the paper feed tray setting, the contents of the items of the settings accepted through the remote operation screen are employed.

Figure 28:
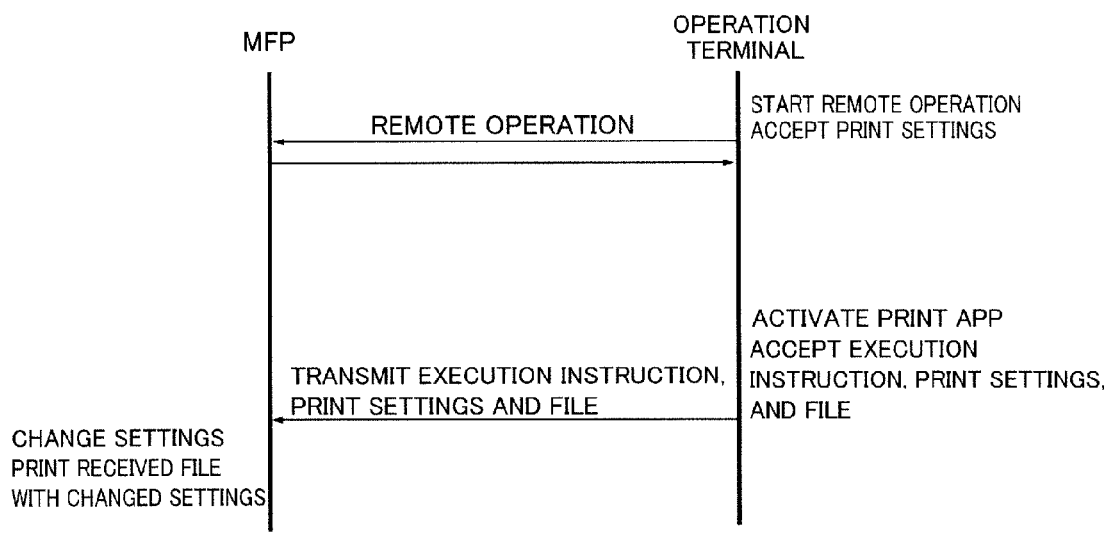
FIG. 28 is a sequence diagram showing an example of communication between MFP 1 and operation terminal 2 in the eighth embodiment of the present invention.

FIG. 28 is a sequence diagram showing an example of communication between MFP 1 and operation terminal 2 in the eighth embodiment of the present invention.

Referring to FIG. 28, when the user starts remote operation on operation terminal 2 and makes print settings, MFP 1 and operation terminal 2 each perform the process related to remote operation. Operation terminal 2 accepts an instruction from the user and then activates the print app. Operation terminal 2 accepts a print execution instruction, print settings, and the selection of a file through the print app, and then transmits the print execution instruction, the print settings, and the file to MFP 1. MFP 1 receives the print execution instruction, the print settings, and the file, then changes the content of the required item, of the items of the settings accepted through the remote operation screen, to the setting accepted through the screen of the print app, and prints the received file with the changed settings.

Figure 29:
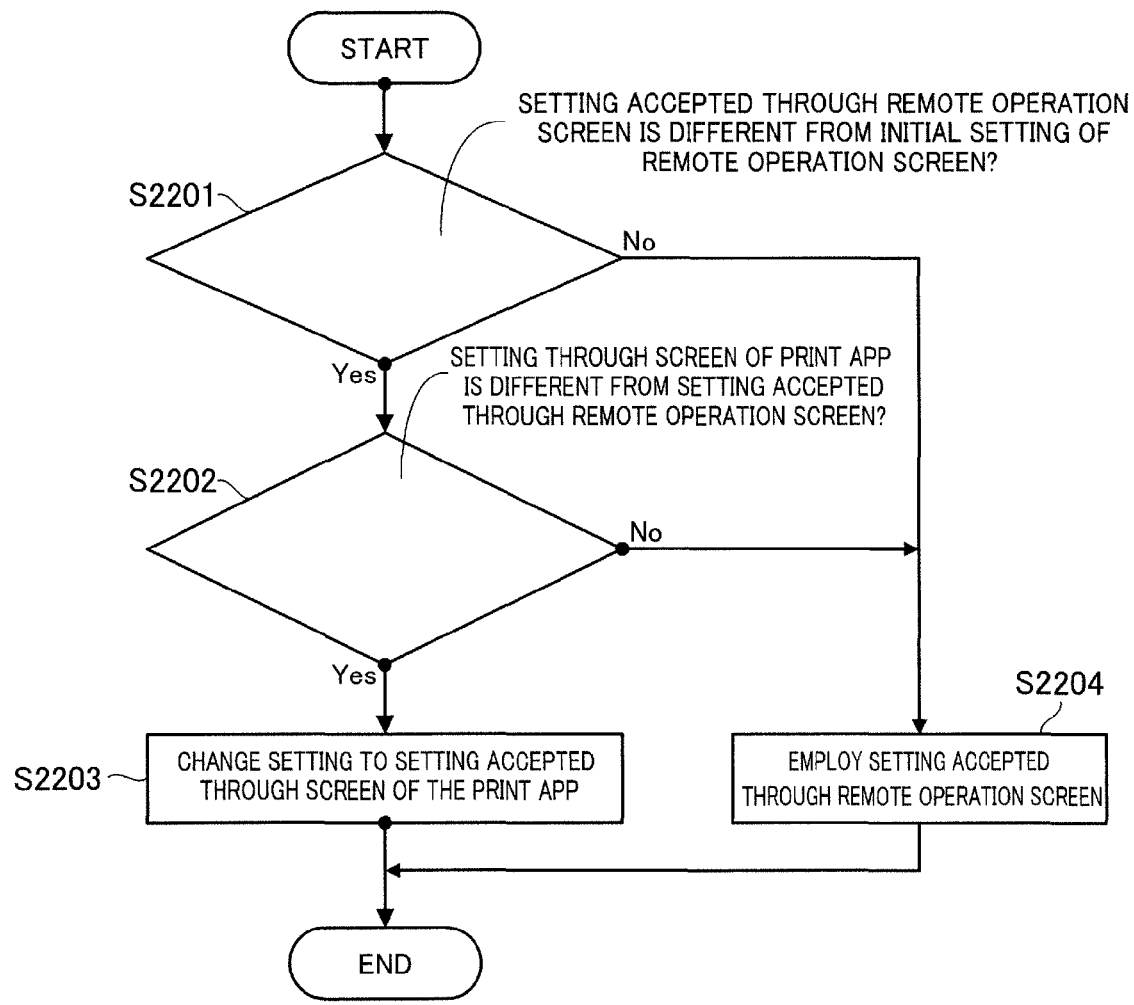
FIG. 29 is a flowchart illustrating operation of MFP 1 when print settings employed by MFP 1 are decided in the eighth embodiment of the present invention.

FIG. 29 is a flowchart illustrating operation of MFP 1 when print settings employed by MFP 1 are decided in the eighth embodiment of the present invention. In this flowchart, it is assumed that the print settings include a plurality of items.

Referring to FIG. 29, when print settings are accepted through both the remote operation screen and the screen of the print app, CPU 101 of MFP 1 determines whether the contents of the items of the settings accepted through the remote operation screen are different from the initial settings of the remote operation screen (S2201).

If it is determined that they are different from the initial settings of the remote operation screen in step S2201 (Yes in S2201), CPU 101 determines whether the content of the item determined to be different in step S2201, of the items of the settings accepted through the screen of the print app, is different from the content of the item of the settings accepted through the remote operation screen (S2202).

If it is determined that it is different from the content of the item of the settings accepted through the remote operation screen in step S2202 (Yes in S2202), CPU 101 changes the content of the item determined to be different in step S2202, of the items of the settings accepted through the remote operation screen, to the content of the item of the settings accepted through the screen of the print app (S2203) and terminates the process.

If it is determined that they are the same as the initial settings of the remote operation screen in step S2201 (No in S2201), or if it is determined that it is the same as the content of the item of the settings accepted through the remote operation screen in step S2202 (No in S2202), CPU 101 employs the settings accepted through the remote operation screen as the actual print settings, without changing the settings (S2204), and then terminates the process.

It is noted that the configuration of the image forming system and the operation of the image forming system except for the operation described above are the same as those of the first embodiment, and therefore, a description thereof will not be repeated.

[Ninth Embodiment]

In the present embodiment, MFP 1 changes settings if the settings accepted through the screen of the print app are different from the initial settings in the print app.

FIG. 30 is a table schematically showing print settings employed by MFP 1 in a case where print settings are accepted through both the remote operation screen and the screen of the print app in the ninth embodiment of the present invention.

Referring to FIG. 30, it is assumed that the settings accepted by MFP 1 through the remote screen (the remote settings) are five copies, sort print, no collate, paper feed tray auto-select, double-sided print, and portrait print, and that the settings accepted through the screen of the print app (the print app settings) are one copy, sort setting, no collate, select paper feed tray 1, single-sided print, and landscape print. It is assumed that the initial settings in the print app (print app initial values) are one copy, sort print, no collate, paper feed tray auto-select, single-sided print, and portrait print.

In this case, of the contents of the items of the settings accepted through the screen of the print app, the contents of the items of paper feed tray setting and print orientation setting (the items hatched in the table) are different from the contents of the initial settings in the print app. MFP 1 therefore changes the content of the item of paper feed tray setting in the items of the actual print settings, from "paper feed tray auto-select" accepted through the remote operation screen to "select paper feed tray 1" accepted through the screen of the print app. MFP 1 also changes the content of the item of print orientation setting in the items of the actual print settings, from "portrait print" accepted through the remote operation screen to "landscape print" accepted through the screen of the print app.

For the items other than the items of paper feed tray and print orientation, the contents of the items of the settings accepted through the remote operation screen are employed.

Figure 31:
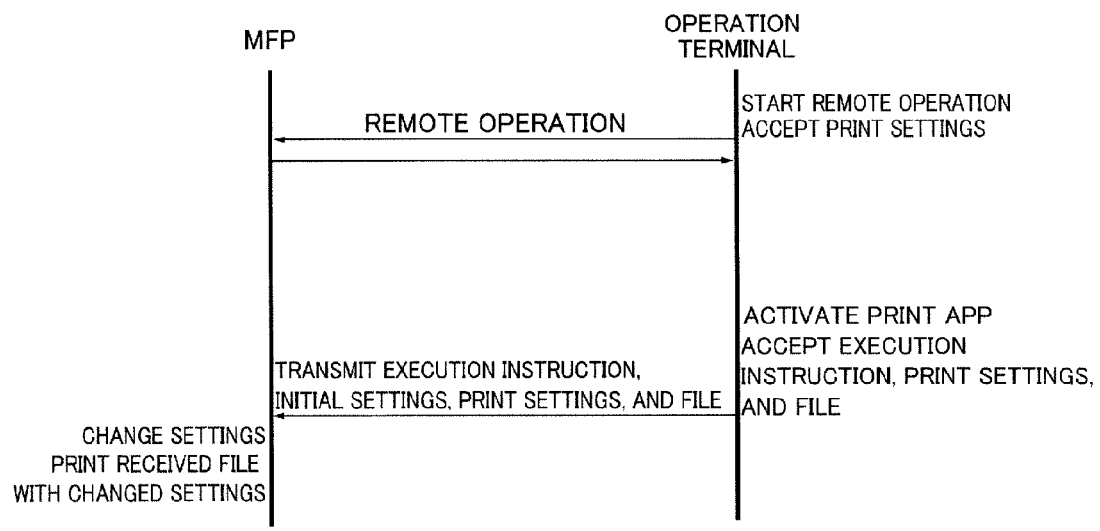
FIG. 31 is a sequence diagram showing an example of communication between MFP 1 and operation terminal 2 in the ninth embodiment of the present invention.

FIG. 31 is a sequence diagram showing an example of communication between MFP 1 and operation terminal 2 in the ninth embodiment of the present invention. In this flowchart, it is assumed that the print settings include a plurality of items.

Referring to FIG. 31, when the user starts remote operation on operation terminal 2 and makes print settings, MFP 1 and operation terminal 2 each perform the process related to remote operation. Operation terminal 2 accepts an instruction from the user and then activates the print app. Operation terminal 2 accepts a print execution instruction, print settings, and the selection of a file through the print app and then transmits the print execution instruction, the print settings, the initial settings in the print app, and the file to MFP 1. MFP 1 receives the print execution instruction, the print settings, the initial settings in the print app, and the file, then changes the content of the required item, of the items of the settings accepted through the remote operation screen, to the setting accepted through the screen of the print app, and prints the received file with the changed settings.

Information of the initial settings of the print app may be transmitted to MFP 1 together with the print execution instruction and the print settings as described above or may be stored in advance on the MFP 1 side (for example, ROM 102 or fixed storage device 110).

Figure 32:
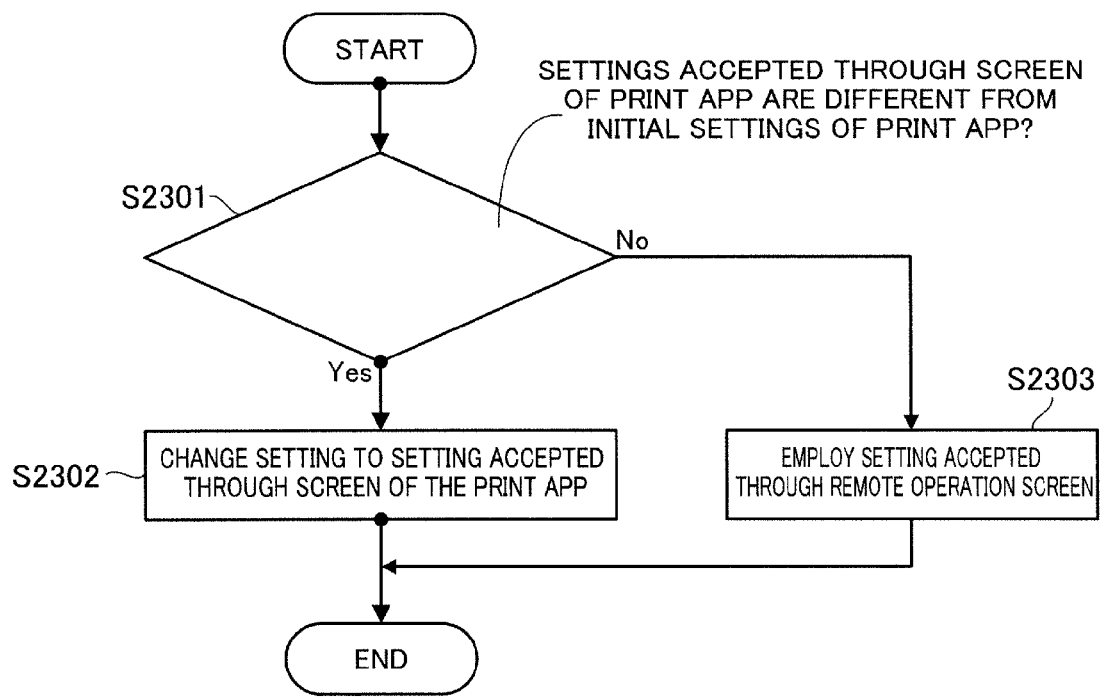
FIG. 32 is a flowchart illustrating operation of MFP 1 when print settings employed by MFP 1 are decided in the ninth embodiment of the present invention.

FIG. 32 is a flowchart illustrating operation of MFP 1 when print settings employed by MFP 1 are decided in the ninth embodiment of the present invention. In this flowchart, it is assumed that the print settings include a plurality of items.

Referring to FIG. 32, when print settings are accepted through both the remote operation screen and the screen of the print app, CPU 101 of MFP 1 determines whether the contents of the items of the settings accepted through the screen of the print app are different from the initial settings of the print app (S2301).

If it is determined that they are different from the initial settings of the print app in step S2301 (Yes in S2301), CPU 101 changes the content of the item determined to be different in step S2301, of the items of the settings accepted through the remote operation screen, to the content of the item of the settings accepted through the screen of the print app (S2302) and terminates the process.

If it is determined that they are the same as the initial settings of the print app in step S2301 (No in S2301), CPU 101 employs the settings accepted through the remote operation screen as the actual print settings without changing the settings (S2303) and terminates the process.

It is noted that the configuration of the image forming system and the operation of the image forming system except for the operation described above are the same as those of the eighth embodiment, and therefore, a description thereof will not be repeated.

[Tenth Embodiment]

In the present embodiment, in a case where MFP 1 cannot do printing with the settings accepted through the remote operation screen, MFP 1 changes all the settings accepted through the remote operation screen to the settings accepted through the screen of the print app.

An example of the case where MFP 1 cannot do printing with the settings accepted through the remote operation screen is a case where the setting of printing ten or more copies is accepted through the remote operation screen although only nine sheets of paper are stored in the paper feed tray of MFP 1.

Figure 33:
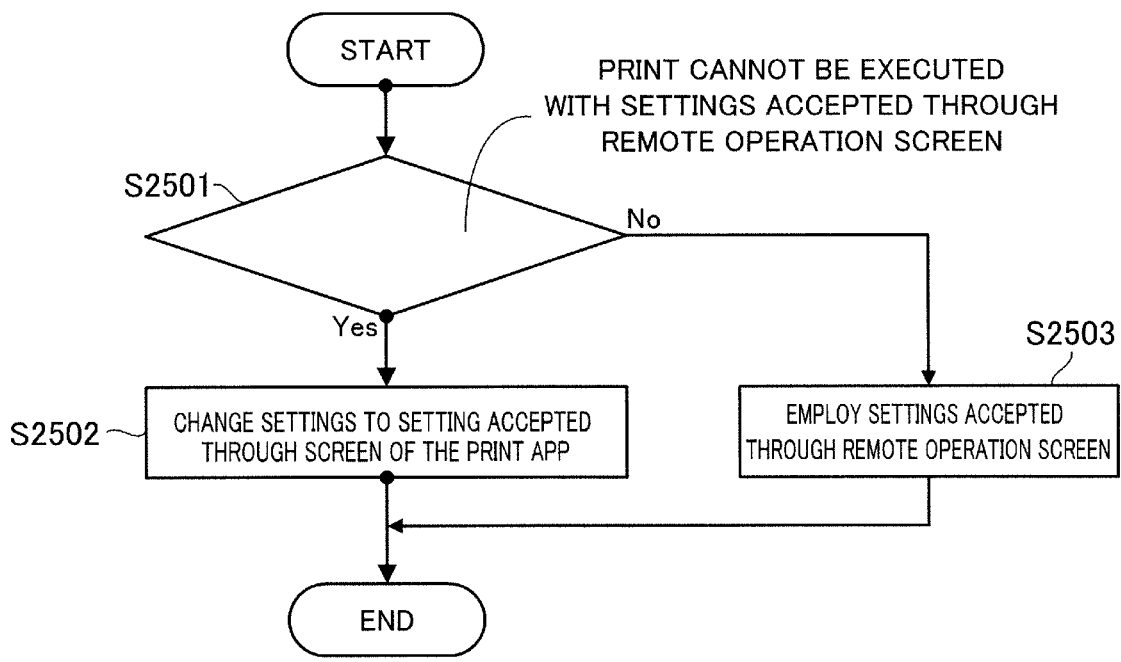
FIG. 33 is a flowchart illustrating operation of MFP 1 when print settings employed by MFP 1 are decided in a tenth embodiment of the present invention.

FIG. 33 is a flowchart illustrating operation of MFP 1 when print settings employed by MFP 1 are decided in the tenth embodiment of the present invention. In this flowchart, it is assumed that the print settings include a plurality of items.

Referring to FIG. 33, when print settings are accepted through both the remote operation screen and the screen of the print app, CPU 101 of MFP 1 determines whether MFP 1 is in a state in which print cannot be executed with the contents of the settings accepted through the remote operation screen (S2501).

If it is determined that MFP 1 is in a state in which print cannot be executed in step S2501 (Yes in S2501), CPU 101 changes the contents of all the items of the settings accepted through the remote operation screen to the contents of the items of the settings accepted through the screen of the print app (S2502) and terminates the process.

If it is determined that MFP 1 is in a state in which print can be executed in step S2501 (No in S2501), CPU 101 employs the settings accepted through the remote operation screen as the actual print settings, without changing the settings (S2503), and terminates the process.

It is noted that the configuration of the image forming system and the operation of the image forming system except for the operation described above are the same as those of the eighth embodiment, and therefore, a description thereof will not be repeated.

In the present embodiment, when the settings accepted through the remote operation screen causes an error to prevent execution of print, MFP 1 can do printing with the settings accepted through the screen of the print app.

[Eleventh Embodiment]

In the present embodiment, MFP 1 changes settings if MFP 1 cannot do printing with the settings accepted through the remote operation screen and the settings accepted through the screen of the print app are different from the initial settings in the print app.

For example, in a case where the setting of 12 copies and the setting of selecting paper feed tray 1 in the item of the paper feed tray setting are accepted through the remote operation screen, if paper feed tray 1 has less than 12 sheets of paper, MFP 1 cannot do printing due to lack of paper. In this case, if paper feed tray 2 ("auto" in the initial settings) is set in the item of the paper feed tray setting that is accepted through the screen of the print app, MFP 1 changes only the content of the item of the paper feed tray setting, from the setting accepted through the remote operation screen to the setting accepted through the screen of the print app.

Figure 34:
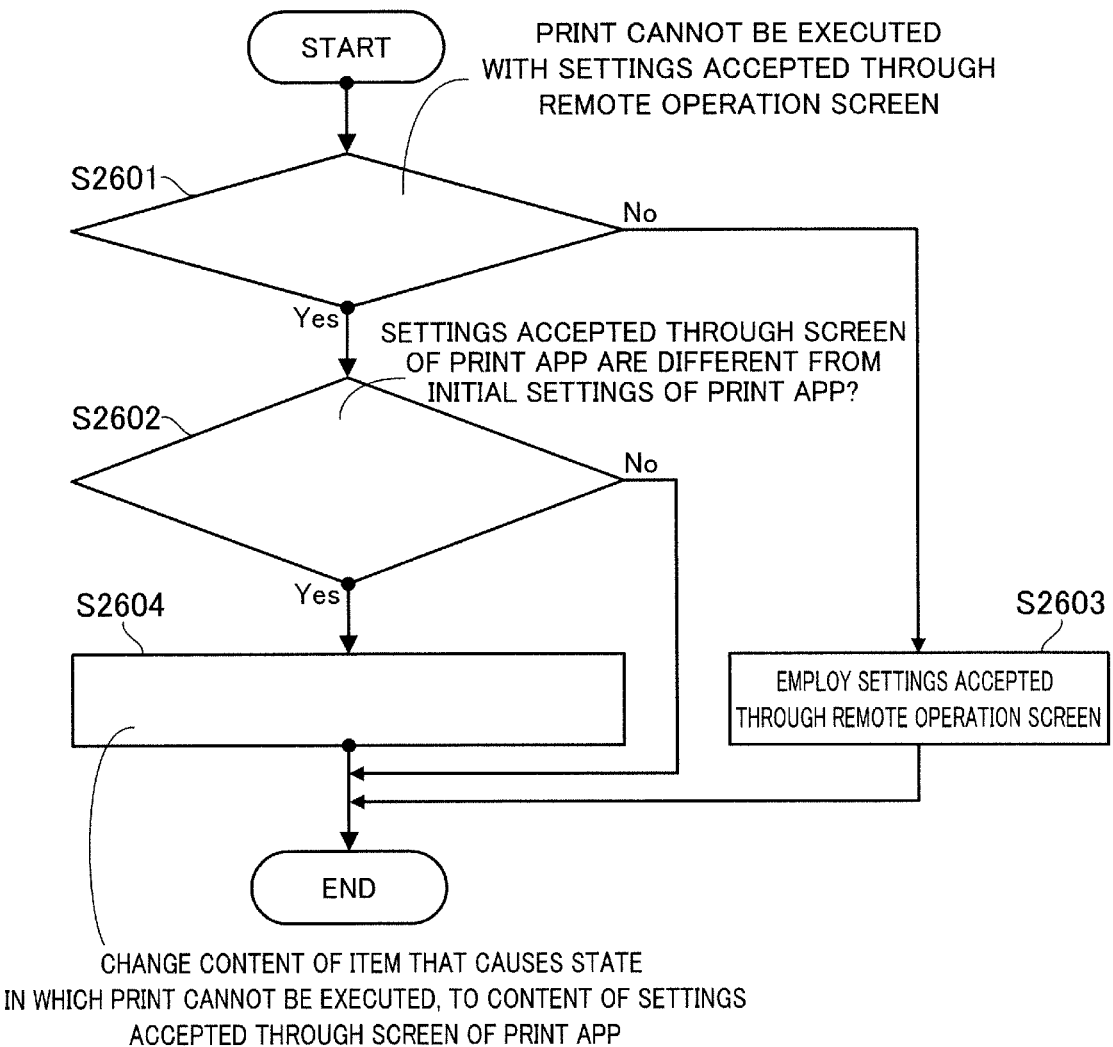
FIG. 34 is a flowchart illustrating operation of MFP 1 when print settings employed by MFP 1 are decided in an eleventh embodiment of the present invention.

FIG. 34 is a flowchart illustrating operation of MFP 1 when print settings employed by MFP 1 are decided in the eleventh embodiment of the present invention. In this flowchart, it is assumed that the print settings include a plurality of items.

Referring to FIG. 34, when print settings are accepted through both the remote operation screen and the screen of the print app, CPU 101 of MFP 1 determines whether MFP 1 is in a state in which print cannot be executed with the settings accepted through the remote operation screen (S2601).

If it is determined that MFP 1 is in a state in which print cannot be executed in step S2601 (Yes in S2601), CPU 101 determines whether the content of the item that causes the state in which print cannot be executed, of the items of the settings accepted through the screen of the print app, is different from the initial setting of the print app (S2602).

If it is determined that it is different from the initial setting of the print app in step S2602 (Yes in S2602), CPU 101 changes the content of the item that causes the state in which print cannot be executed, of the items of the settings accepted through the remote operation screen, to the content of the item of the settings accepted through the screen of the print app (S2604) and terminates the process. On the other hand, if it is the same as the initial setting of the print app in step S2602 (No in S2602), CPU 101 terminates the process without performing printing.

If it is determined that MFP 1 is in a state in which print can be executed in step S2601 (No in S2601), CPU 101 employs the settings accepted through the remote operation screen as the actual print settings, without changing the settings (S2603), and terminates the process.

It is noted that the configuration of the image forming system and the operation of the image forming system except for the operation described above are the same as those of the eighth embodiment, and therefore, a description thereof will not be repeated.

In the present embodiment, when the items of the settings accepted through the remote operation screen include an item that causes an error to prevent execution of print, MFP 1 can perform printing by changing only the content of that item of the settings to the content of the item of the settings accepted from the screen of the print app.

According to the eighth to eleventh embodiments, if there is a difference between the print settings accepted through the remote operation screen and the print settings accepted through the screen of the print app, the conflict is eliminated, and the setting that seems to be the print setting intended by the user is decided as the print setting to be employed by MFP 1. Accordingly, the user no longer has to make print settings again, thereby saving the user time and trouble.

In the eighth to eleventh embodiments, MFP 1 accepts the settings from operation terminal 2 through the screen of the print app at any timing. For example, MFP 1 may accept the settings from operation terminal 2 through the screen of the print app, for example, when receiving a print execution instruction or a file to be printed from operation terminal 2.

[Twelfth Embodiment]

In the present embodiment, if operation of MFP 1 is accepted through operation panel 130 after the remote operation screen is displayed on operation terminal 2 and before a print execution instruction or an image is accepted from operation terminal 2, a job related to the operation accepted through operation panel 130 is executed prior to a job accepted from operation terminal 2.

For example, when MFP 1 enters a state in which it waits for a print execution instruction given through the print app, if document sensor 125 detects a document placed in the document tray, MFP 1 does not employ the print settings accepted through the remote operation screen for a job related to the document detected by document sensor 125. In this case, MFP 1 may discard the print settings accepted through the remote operation screen. MFP 1 may enter a state in which it waits for a print execution instruction given through the print app, after a job related to the operation accepted through operation panel 130 is completed.

Figure 35:
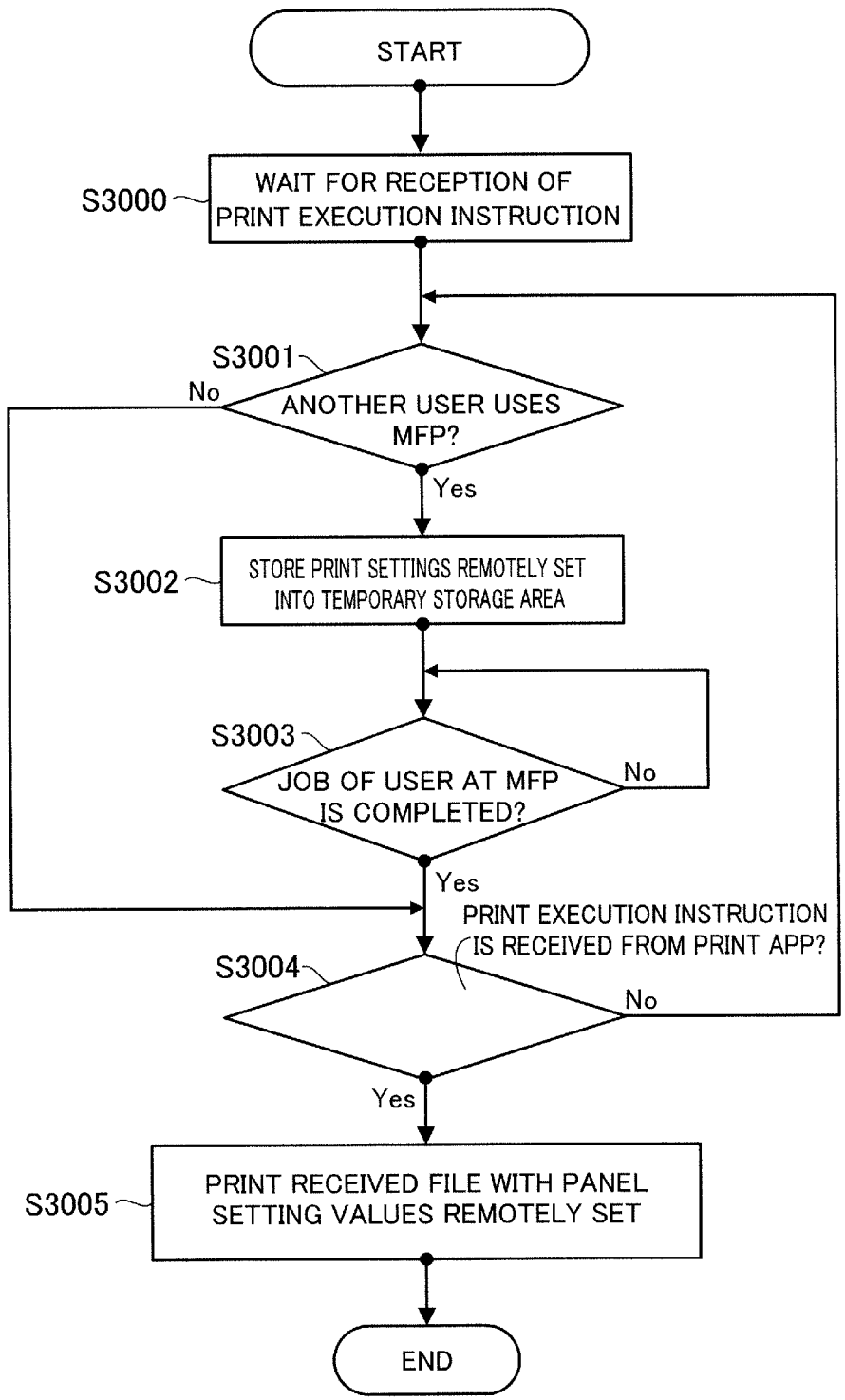
FIG. 35 is a flowchart illustrating operation of MFP 1 in a twelfth embodiment of the present invention.

FIG. 35 is a flowchart illustrating operation of MFP 1 in the twelfth embodiment of the present invention.

Referring to FIG. 35, CPU 101 of MFP 1 enter a state in which it waits for reception of a print execution instruction or an original image from operation terminal 2 (print instruction waiting state) after performing the process related to remote operation (S3000). CPU 101 determines whether operation by another user is accepted through operation panel 130 while waiting for reception of a print execution instruction or an original image (S3001).

If it is determined that operation by another user is accepted in step S3001 (Yes in S3001), CPU 101 stores the print settings accepted through the remote operation screen so far into a temporary storage area such as SRAM 103 (S3002). CPU 101 then determines whether a job related to operation accepted through operation panel 130 (a job of the user at the MFP) is completed (S3003). CPU 101 repeats the process in step S3003 until it is determined that the job is completed.

If it is determined that operation by another user is not accepted in step S3001 (No in S3001), CPU 101 proceeds to the process in step S3004.

If it is determined that the job is completed in step S3003 (Yes in S3003), CPU 101 determines whether a print execution instruction or an original image is received from the print app (S3004).

If it is determined that a print execution instruction or an original image is received in step S3004 (Yes in S3004), CPU 101 prints the received file with the print settings stored in SRAM 103 (the panel setting values remotely set) (S3005) and terminates the process.

If it is determined that a print execution instruction or an original image is not received in step S3004 (No in S3004), CPU 101 proceeds to the process in step S3001.

It is noted that the configuration of the image forming system and the operation of the image forming system except for the operation described above are the same as those of the first embodiment, and therefore, a description thereof will not be repeated.

In the present embodiment, even while operation related to printing is performed in operation terminal 2, another user different from the user of operation terminal 2 can execute his/her own job with MFP 1 prior to the job of operation terminal 2.

[Others]

The foregoing embodiments can be combined as appropriate. For example, each of the embodiments (the fourth to seventh embodiments) in which an image is acquired after print settings are accepted through the remote operation screen of operation terminal 2 and a print execution instruction is accepted without selection of an image can be combined with each of the embodiments (the eighth to eleventh embodiments) in which print settings are accepted through both the remote operation screen and the screen of the print app.

The process in the foregoing embodiments may be performed by software or using hardware circuitry. A program for executing the process in the foregoing embodiments may be provided. A recording medium, such as a CD-ROM, a flexible-disk, a hard disk, a ROM, a RAM, or a memory card, encoded with the program may be provided to users. The program is executed by a computer such as a CPU. The program may be downloaded to the device through a communication line such as the Internet.

Although the present invention has been described and illustrated in detail, it is clearly understood that the same is by way of illustration and example only and is not to be taken by way of limitation, the scope of the present invention being interpreted by the terms of the appended claims.

What is claimed is:

1. An image forming apparatus with a transmitter/receiver capable of transmission and reception with an external operation terminal, and a display, comprising:
   a request accepting unit for accepting a request for display of an operation screen from the operation terminal through a first application activated in the operation terminal;
   a display unit for transmitting an operation screen that is a screen for operating the image forming apparatus to the operation terminal in response to the request for display accepted by the request accepting unit, and displaying the operation screen on the operation terminal;
   a first setting accepting unit for accepting a print setting and a print execution instruction from the operation terminal through the operation screen displayed by the display unit;
   a second setting accepting unit for accepting a print setting and a print execution instruction through a screen of a second application that is activated in the operation terminal and is different from the first application;
   an image acquisition unit for acquiring an image to be printed; and
   a print unit for printing the image with the setting accepted by the first setting accepting unit and the second setting accepting unit,
   wherein when the operation screen is displayed on the operation terminal by the display unit and a print execution instruction is accepted through the screen of the second application, the print unit prints the image with the setting accepted by the first setting accepting unit.

2. The image forming apparatus according to claim 1, wherein
   the display unit creates a key for activating the second application in the operation screen, transmits the created operation screen to the operation terminal, and displays the created operation screen on the operation terminal, and
   when an instruction to activate the second application by a user is accepted through the operation screen displayed by the display unit, an instruction to activate the second application is transmitted to the operation terminal.

3. The image forming apparatus according to claim 1, further comprising an activation determination unit for determining whether the second application has been activated before the first application is activated on the operation terminal, if a print instruction is accepted by the second setting accepting unit, wherein
   if the activation determination unit determines that that the first application is activated later, the print unit prints the image with the setting accepted by the first setting accepting unit, and
   if the activation determination unit determines that the second application is activated later, the print unit prints the image with the setting accepted by the second setting accepting unit.

4. The image forming apparatus according to claim 1, further comprising a setting change unit for changing the setting accepted by the first setting accepting unit to the setting accepted by the second setting accepting unit, wherein the print unit does printing with the changed setting if the setting change unit changes settings.

5. The image forming apparatus according to claim 4, wherein the setting change unit changes settings if the setting accepted by the first setting accepting unit is same as an initial setting in the operation screen and the setting accepted by the second setting accepting unit is different from the setting accepted by the first setting accepting unit.

6. The image forming apparatus according to claim 4, wherein the setting change unit changes settings if the setting accepted by the second setting accepting unit is different from an initial setting in the second application.

7. The image forming apparatus according to claim 4, wherein if the print unit cannot do printing with the setting accepted by the first setting accepting unit, the setting change unit changes the setting accepted by the first setting accepting unit entirely to the setting accepted by the second setting accepting unit.

8. The image forming apparatus according to claim 4, wherein the setting change unit changes settings if the print unit cannot do printing with the setting accepted by the first setting accepting unit and the setting accepted by the second setting accepting unit is different from an initial setting in the second application.

9. The image forming apparatus according to claim 1, wherein if, after a setting is accepted from the operation terminal and a print execution instruction is accepted by the second setting accepting unit without selection of the image, the image acquisition unit acquires the image from the same operation terminal as the operation terminal that accepts the setting and the print execution instruction, the print unit prints the image with the setting accepted from the operation terminal.

10. The image forming apparatus according to claim 9, further comprising:
a press notice receiving unit for receiving a notice from the operation terminal to indicate that operation irrelevant to transmission of an image is performed in the operation terminal, after a print execution instruction is accepted by the second setting accepting unit and before the image is acquired by the image acquisition unit; and
a first setting discard unit for discarding a setting accepted from the operation terminal if the notice is received by the press notice receiving unit.

11. The image forming apparatus according to claim 9, further comprising:
an activation end notice receiving unit for receiving a notice from the operation terminal to indicate that activation of the first application for displaying an operation screen of the image forming apparatus on the operation terminal is terminated, after a print execution instruction is accepted by the second setting accepting unit and before the image is acquired by the image acquisition unit; and
a second setting discard unit for discarding a setting accepted from the operation terminal if the notice is received by the activation end notice receiving unit.

12. The image forming apparatus according to claim 9, wherein if the image acquisition unit acquires a plurality of images from the same operation terminal as the operation terminal that accepts a setting and a print execution instruction, before a predetermined time has elapsed since the setting is accepted from the operation terminal and the print execution instruction is accepted by the second setting accepting unit without selection of an image, the print unit prints all of the plurality of images with the setting accepted from the operation terminal.

13. The image forming apparatus according to claim 1, wherein the image acquisition unit acquires an image from the operation terminal.

14. The image forming apparatus according to claim 1, further comprising an operation accepting unit for accepting operation of the image forming apparatus through the display, wherein
if an operation is accepted by the operation accepting unit after the operation screen is displayed by the display unit and before a print execution instruction or an image is accepted from the operation terminal, a job related to the operation accepted by the operation accepting unit is executed prior to a job accepted from the operation terminal.

15. The image forming apparatus according to claim 1, further comprising:
a coordinate receiving unit for receiving, from the operation terminal, a coordinate at which input is accepted on the operation screen displayed by the display unit; and
an update unit for displaying an updated screen of the operation screen on the operation terminal based on the coordinate received by the coordinate receiving unit.

16. A control method for an image forming apparatus with a transmitter/receiver capable of transmission and reception with an external operation terminal, and a display, comprising:
accepting a request for display of an operation screen from the operation terminal through a first application activated in the operation terminal;
transmitting an operation screen that is a screen for operating the image forming apparatus to the operation terminal in response to the accepted request for display, and displaying the operation screen on the operation terminal;
accepting a print setting and a print execution instruction from the operation terminal through the displayed operation screen;
accepting a print setting and a print execution instruction through a screen of a second application that is activated in the operation terminal and is different from the first application;
acquiring an image to be printed; and
printing the image with the setting accepted through the operation screen and through the screen of the second application,
wherein when the operation screen is displayed on the operation terminal and a print execution instruction is accepted through the screen of the second application, the image is printed with the setting accepted through the operation screen.

17. A non-transitory computer-readable recording medium encoded with a control program for an image forming apparatus with a transmitter/receiver capable of transmission and reception with an external operation terminal, and a display, the program causing a computer to execute processing including:
accepting a request for display of an operation screen from the operation terminal through a first application activated in the operation terminal;
transmitting an operation screen that is a screen for operating the image forming apparatus to the operation terminal in response to the accepted request for display, and displaying the operation screen on the operation terminal;
accepting a print setting and a print execution instruction from the operation terminal through the displayed operation screen;

accepting a print setting and a print execution instruction through a screen of a second application that is activated in the operation terminal and is different from the first application;
acquiring an image to be printed; and
printing the image with the setting accepted through the operation screen and through the screen of the second application,
wherein when the operation screen is displayed on the operation terminal and a print execution instruction is accepted through the screen of the second application, the image is printed with the setting accepted through the operation screen.

* * * * *